US012569782B2

(12) United States Patent
Contreras et al.

(10) Patent No.: US 12,569,782 B2
(45) Date of Patent: Mar. 10, 2026

(54) COMPOSITIONS AND RELATED KITS AND METHODS FOR WATER TREATMENT

(71) Applicant: InnoTech Alberta Inc., Edmonton (CA)

(72) Inventors: Pablo Contreras, Edmonton (CA); Shad W. Siddiqui, Edmonton (CA); Haibo Huang, Edmonton (CA)

(73) Assignee: InnoTech Alberta Inc., Edmonton (CA)

( * ) Notice: Subject to any disclaimer, the term of this patent is extended or adjusted under 35 U.S.C. 154(b) by 504 days.

(21) Appl. No.: 18/082,915

(22) Filed: Dec. 16, 2022

(65) Prior Publication Data

US 2023/0191286 A1 Jun. 22, 2023

Related U.S. Application Data

(60) Provisional application No. 63/290,431, filed on Dec. 16, 2021.

(51) Int. Cl.

| | |
|---|---|
| ***B01D 17/04*** | (2006.01) |
| ***C02F 1/56*** | (2023.01) |
| ***C02F 1/68*** | (2023.01) |
| *C02F 101/32* | (2006.01) |
| *C02F 103/10* | (2006.01) |
| *C02F 103/34* | (2006.01) |
| *C02F 103/36* | (2006.01) |

(52) U.S. Cl.

CPC ......... *B01D 17/047* (2013.01); *B01D 17/045* (2013.01); *C02F 1/56* (2013.01); *C02F 1/682* (2013.01); *C02F 2101/32* (2013.01); *C02F 2101/325* (2013.01); *C02F 2103/10* (2013.01); *C02F 2103/34* (2013.01); *C02F 2103/365* (2013.01); *C02F 2305/04* (2013.01)

(58) Field of Classification Search

CPC ....... B01D 17/047; B01D 17/045; C02F 1/56; C02F 1/682; C02F 2101/32; C02F 2101/325; C02F 2103/10; C02F 2103/34; C02F 2103/365; C02F 2305/04

See application file for complete search history.

(56) References Cited

U.S. PATENT DOCUMENTS

| | | | | |
|---|---|---|---|---|
| 4,182,689 | A * | 1/1980 | Presley | B01D 17/047 210/708 |
| 4,374,734 | A * | 2/1983 | Newcombe | C09K 8/602 210/708 |
| 8,858,802 | B2 | 10/2014 | Polizzotti et al. | |
| 2011/0131873 | A1 * | 6/2011 | Soane | C02F 1/004 210/207 |
| 2011/0147306 | A1 | 6/2011 | Polizzotti et al. | |
| 2016/0310964 | A1 | 10/2016 | Yuan et al. | |
| 2017/0216791 | A1 * | 8/2017 | Gillis | B01F 27/50 |

FOREIGN PATENT DOCUMENTS

| | | | |
|---|---|---|---|
| CA | 2156444 | | 3/1996 |
| CN | 105271466 | | 1/2016 |
| CN | 105271466 | A * | 1/2016 |
| CN | 105481225 | | 4/2016 |

OTHER PUBLICATIONS

Zouboulis et. al. "Treatment of oil-in-water emulsions by coagulation and dissolved-air flotation" Colloids and Surfaces A: Physicochemical and Engineering Aspects 172 (2000) 153-161 (Year: 2000).*

Chen et. al. "Effect of partially hydrolyzed polyacrylamide on emulsification stability of wastewater produced from polymer flooding". Journal of Petroleum Science and Engineering. 133:431-439 (Year: 2015).*

Zhou et. al. "Hydrophobic modification of cationic microblocked polyacrylamide and its enhanced flocculation performance for oily wastewater treatment". J Mater Sci 54:10024-10040 (Year: 2019).*

Wang et. al. "Flocculation performance of epichlorohydrin-dimethylamine polyamine in treating dyeing wastewater" Journal of Environmental Management 91:423-431 (Year: 2009).*

Huang et. al. "Spontaneous Vesicle Formation in Aqueous Mixtures of Cationic Surfactants and Partially Hydrolyzed Polyacrylamide". Journal of Colloid and Interface Science 236, 201-207 (Year: 2001).*

Shu et al., "Evaluation of newly developed reverse demulsifiers and cationic polyacrylamide flocculants for efficient treatment of oily produced water," Colloids and Surfaces A 610 (2021), pp. 1-9.

Qiao et al., "High-efficiency separation for SAGD produced liquids," Journal of Petroleum Science and Engineering, (2016), pp. 148-153.

Russel et al., "Electrostatic Stabilization," Cambridge University Press (2012), pp. 258-309.

Russel et al., "Polymeric Stabilization," Cambridge University Press (2012), pp. 310-328.

Shu, et al., "Separation of SAGD produced emulsions through a combined pre-dewatering and demulsification process," Journal of Petroleum Science and Engineering, (2020), pp. 1-12.

Sun et al., "Effects of Surfactants on the Improvement of Sludge Dewaterability Using Cationic Flocculants," (Oct. 2014), Vo. 9, Issue 10. pp. 1-10.

Huang et al., "Study on Demulsification-Flocculation Mechanism (Continued)

*Primary Examiner* — Liam Royce

(74) *Attorney, Agent, or Firm* — CHRISTENSEN O'CONNOR JOHNSON KINDNESS PLLC

(57) ABSTRACT

Compositions for water treatment are provided. In some embodiments, the composition comprises: a cationic polyacrylamide-type polymer having a charge density of about 10% to about 40% and a molecular weight of about $600\times10^4$ g/gmol to about $900\times10^4$ g/gmol; and a cationic surfactant, the surfactant comprising an alkyl quaternary ammonium salt. Also provided are related methods and kits for treating wastewater with dispersed and dissolved organic matters and oils. Embodiments of the compositions, methods, and kits can be used to treat oil-in-water emulsions, produced water, and process water containing dispersed and/or dissolved organic matter such as hydrocarbons from various process industries including Steam Assisted Gravity Drainage (SAGD) oil operations.

11 Claims, 29 Drawing Sheets

(56) References Cited

OTHER PUBLICATIONS f Oil-Water Emulsion in Produced Water from Alkali/Surfactant/Polymer Flooding," Polymers (2019), pp. 1-13.
Bolto et al., "The Use of Polymers in the Flotation Treatment of Wastewater," Processes (2019), pp. 1-12.

* cited by examiner

COMPOSITIONS AND RELATED KITS AND METHODS FOR WATER TREATMENT

RELATED APPLICATION

The present application claims priority to U.S. Provisional Patent Application No. 63/290,431 filed Dec. 16, 2021, the entire contents of which are incorporated herein by reference.

TECHNICAL FIELD

The present disclosure relates to treatment of contaminated fluids. More particularly, the present disclosure relates to compositions, kits, and methods for treatment of wastewaters including oil-in-water emulsions containing dispersed and/or dissolved organic matter.

BACKGROUND

Contaminated fluids from industrial operations may need to be treated before being recycled or released into the environment. Oil and grease are among the most common contaminants found in the wastewater of a wide range of industries including oil production and oil refineries as well as the mining, aviation, manufacturing, pulp and paper, pharmaceuticals, food, beverage, textile, leather, coal gasification, metal finishing industries and more.

Industrial oily wastewater often undergoes primary and secondary treatment processes before being recycled or released. Conventional primary treatments include skimming and gravity separation processes that remove the bulk of the oil to protect the downstream secondary treatment systems from becoming overloaded. The water that comes out of the primary treatment is typically in the form of a stable oil-in-water emulsion. The goal of the secondary treatment is to break the emulsion and remove emulsified oil droplets and dissolved oil from the water. There are several chemical, electrical, and physical methods that can be used to break emulsions; however, removing fine droplets and dissolved oil remains challenging.

When treated water is released back into the environment, the allowable discharge concentration for oil is usually regulated by an environmental authority. For example, in oil recovery operations, a total oil content of less than 30 mg/L is a guideline for produced water to be discharged into open bodies of water. Moreover, re-use of the treated water for other applications may require even lower oil content to minimize equipment fouling. For example, the total oil content limit for boiler intake for steam generation using treated produced water is typically less than 10 mg/L or 10 ppm. To reach these limits, elaborate water treatment steps are often required and may still leave some dissolved oil in the water.

Water treatment in Steam Assisted Gravity Drainage (SAGD) operations is a particular challenge. SAGD produced water is in the form of an oil-in-water emulsion that contains dispersed and dissolved hydrocarbons and must be treated such that it can be recycled to generate steam for re-injection into the reservoir. For SAGD operations, the current treatment method for produced water involves addition of a cationic polymer to the water to induce oil droplet coalescence, followed by mechanical treatments through one or more coalescers, floatation units, and filtration systems. However, mechanical treatment schemes fail to capture fine oil droplets (typically less than 20 μm in size) and/or dissolved oil, which often ends up downstream and affects boiler efficiency. Treatment of process water from oil sands mining operations faces similar challenges, resulting in emulsified and dissolved oil in the water being released into tailings ponds.

SUMMARY

In one aspect, there is provided a composition for water treatment, comprising: a cationic polyacrylamide-type polymer having a charge density of about 10% to about 40% and a molecular weight of about $600\times10^4$ g/gmol to about $900\times10^4$ g/gmol; and a cationic surfactant, the surfactant comprising an alkyl quaternary ammonium salt.

In some embodiments, the polymer comprises partially hydrolyzed polyacrylamide (PHPAM).

In some embodiments, wherein the charge density of the polymer is about 25% to about 35%.

In some embodiments, the polymer has a molecular weight of about $750\times10^4$ g/gmol to about $850\times10^4$ g/gmol.

In some embodiments, the surfactant comprises a mono-long chain alkyl quaternary ammonium salt.

In some embodiments, the surfactant is selected from: 1-hexadecyltrimethylammonium bromide, 1-hexadecyltrimethylammonium chloride, 1-dodecyltrimethylammonium bromide, 1-dodecyltrimethylammonium chloride, tetradecyltrimethylammonium bromide, and tetradecyltrimethylammonium chloride.

In some embodiments, the surfactant and the polymer are at a ratio of between about 2:1 and about 1:2 ppm.

In another aspect, there is provided a method for treating water containing organic matter, comprising: providing a cationic polyacrylamide-type polymer having a charge density of about 10% to about 40% and a molecular weight of about $600\times10^4$ g/gmol to about $900\times10^4$ g/gmol; providing a cationic surfactant, the surfactant comprising an alkyl quaternary ammonium salt; and contacting the water with the polymer and the surfactant.

In some embodiments, the polymer and surfactant are combined prior to contacting the water.

In some embodiments, the polymer and surfactant are added to the water sequentially.

In some embodiments, the polymer and the surfactant are continuously mixed with the water for a suitable period of time.

In some embodiments, the polymer comprises PHPAM.

In some embodiments, the surfactant is selected from: 1-hexadecyltrimethylammonium bromide, 1-hexadecyltrimethylammonium chloride, 1-dodecyltrimethylammonium bromide, 1-dodecyltrimethylammonium chloride, tetradecyltrimethylammonium bromide, and tetradecyltrimethylammonium chloride.

In some embodiments, the organic matter comprises oil and wherein the water and the organic matter are in the form of an oil-in-water emulsion.

In some embodiments, the surfactant, the polymer, and the oil are at a ratio of between about 1:1:1000 to 1:2:100 ppm.

In some embodiments, the polymer and the surfactant are at dosages determined based on the isoelectric point (IEP) of the oil-in-water emulsion.

In some embodiments, the water is selected from: produced water from an oil recovery operation; process water from an oil recovery operation; wastewater from an industrial process; and process water from an industrial process.

In another aspect, there is provided a kit for water treatment comprising: a cationic polyacrylamide-type polymer having a charge density of about 10% to about 40% and a molecular weight of about 600×$10^4$ g/gmol to about 900×$10^4$ g/gmol; a cationic surfactant, the surfactant comprising an alkyl quaternary ammonium salt; and instructions for use of the polymer and the surfactant to treat water containing organic matter.

In some embodiments, the polymer comprises PHPAM.

In some embodiments, the surfactant is selected from: 1-hexadecyltrimethylammonium bromide, 1-hexadecyltrimethylammonium chloride, 1-dodecyltrimethylammonium bromide, 1-dodecyltrimethylammonium chloride, tetradecyltrimethylammonium bromide, and tetradecyltrimethylammonium chloride.

Other aspects and features of the present disclosure will become apparent, to those ordinarily skilled in the art, upon review of the following description of specific embodiments of the disclosure.

BRIEF DESCRIPTION OF THE DRAWINGS

Some aspects of the disclosure will now be described in greater detail with reference to the accompanying drawings. In the drawings.

DETAILED DESCRIPTION

Generally, the present disclosure provides a composition for treating water to remove organic matter such as oil in a dispersed and/or dissolved state. The composition may comprise a cationic polyacrylamide-type polymer and a cationic surfactant. Related methods and kits for treating water containing organic matter are also provided.

As used herein the terms "a", "an," and "the" may include plural referents unless the context clearly dictates otherwise.

The compositions, kits, and methods described herein may be used to treat contaminated fluids. The term "contaminated fluid" is used herein to refer to a fluid containing any undesirable matter intended or desired to be removed therefrom. In some embodiments, the contaminated fluid comprises water containing organic matter. As used herein, "organic matter" or "organics" encompasses any matter comprising organic compounds and water "containing" organic matter includes water in which such matter is suspended, dispersed, dissolved, or otherwise present in the water.

In some embodiments, the organic matter comprises hydrocarbons in the form of oil. In some embodiments, the water and organic matter are in the form of an oil-in-water emulsion. As used herein, an "oil-in-water emulsion" or "o/w emulsion" is an emulsion in which small droplets of oil (the dispersed phase) are suspended or dispersed in water (the continuous phase). In some embodiments, the emulsion also contains dissolved organic matter (e.g. dissolved oil) within the continuous water phase.

It will be understood that reference to the "water" to be treated herein refers to water with organic matter therein, including an emulsion with both a dispersed phase and a continuous phase.

Figure 1:
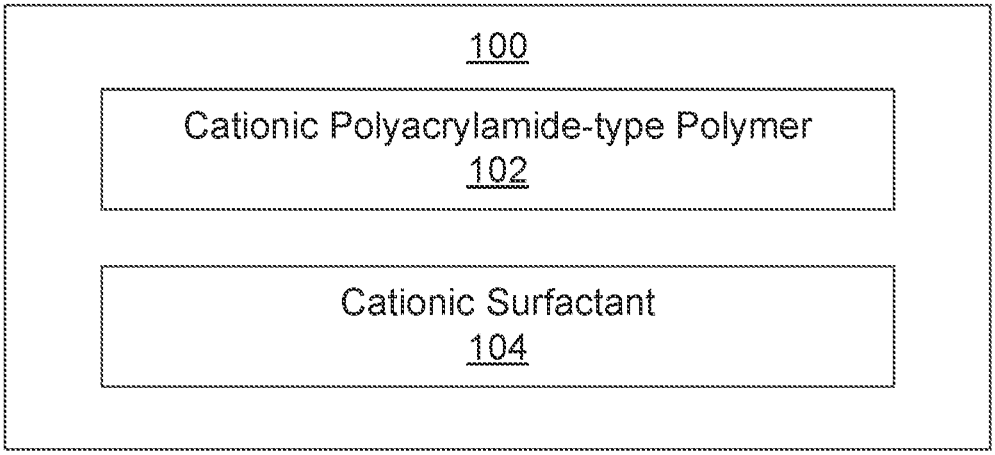
FIG. 1 is a block diagram of an example composition for water treatment, according to some embodiments.

An example composition 100 for treating water containing organic matter will be discussed with reference to FIG. 1. In this embodiment, the composition comprises a cationic polyacrylamide-type polymer 102 and a cationic surfactant 104.

As used herein, "polyacrylamide-type polymer" is intended to include any polymer formed from acrylamide or its derivatives including copolymers of acrylamide. In some embodiments, the polyacrylamide-type polymer 102 is partially hydrolyzed polyacrylamide (PHPAM). The PHPAM may have the general formula (I):

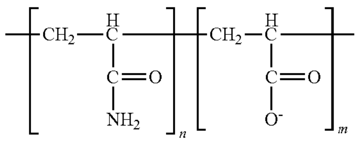

wherein n and m are the number of monomer units.

In some embodiments, the number of monomer units (m+n) can vary between 84,507 and 126,761. In other embodiments, the number of monomer units may be any other suitable number. The charged head group of the polymer is not shown in formula (I) above. The charged head group may be, for example, K+ (potassium ion), Na+ (sodium ion), or any other suitable cation.

The cationic polymer 102 may have a charge density of between about 10% and 40%, or between about 20% and about 40%, or more particularly between about 25% and about 35%. In some embodiments, the polymer 102 has a charge density of about 30%. As used herein "charge density" refers to the percent of positively charged units in the polymer.

The cationic polymer 102 may have a molecular weight of between about $600\times10^4$ g/gmol and about $900\times10^4$ g/gmol, or between about $700\times10^4$ g/gmol and about $900\times10^4$ g/gmol, or more particularly between about $750\times10^4$ g/gmol and $850\times10^4$ g/gmol. In some embodiments, the polymer 102 has a molecular weight of approximately $800\times10^4$ g/gmol.

The cationic surfactant 104 in this embodiment comprises a quaternary ammonium salt type surfactant. The quaternary ammonium salt may be an alkyl quaternary ammonium salt having general formula (II):

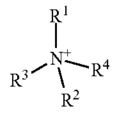

wherein $R^1$-$R^4$ are alkyl groups.

The term "alkyl", as used herein, is intended to be inclusive of straight chain (linear), branched, and cyclic saturated hydrocarbons. The alkyl group may have one or more carbon atoms, or between 1 and 20 carbon atoms (i.e. C1-C20). In some embodiments, the quaternary ammonium salt is a mono-long-chain alkyl quaternary ammonium salt in which $R^1$ is a longer alkyl chain than $R^2$, $R^3$, and $R^4$. In some embodiments, $R^1$ is a C8-C24 alkyl group, or a C10-C20 alkyl group, or more particularly a C12-C16 alkyl group. $R^2$-$R^4$ may each be a $C_1$-$C_4$ alkyl group, or more particularly a C1-C2 alkyl group.

In some specific embodiments, the quaternary ammonium salt is a 1-hexadecyltrimethylammonium salt in which $R^1$ is a hexadecyl group (C16) and $R^2$, $R^3$, and $R^4$ are each methyl groups (C1). The 1-hexadecyltrimethylammonium salt may be 1-hexadecyltrimethylammonium bromide or 1-hexadecyltrimethylammonium chloride, for example. In other embodiments, the quaternary ammonium salt is a 1-dodecyltrimethylammonium salt in which $R^1$ is a dodecyl group (C12) and $R^2$, $R^3$, and $R^4$ are each methyl groups (C1). The 1-dodecyltrimethylammonium salt may be 1-dodecyltrimethylammonium bromide or 1-dodecyltrimethylammonium chloride, for example. In other embodiments, the quaternary ammonium salt is a tetradecyltrimethylammonium salt in which $R^1$ is a tetradecyl group (C14) and $R^2$, $R^3$, and $R^4$ are each methyl groups (C1). The tetradecyltrimethylammonium salt may be tetradecyltrimethylammonium bromide or tetradecyltrimethylammonium chloride, for example.

The composition 100 may comprise between about 1 wt % and about 99 wt % cationic polymer 102 and between about 1 wt % and about 99 wt % cationic surfactant 104. In some embodiments, the composition 100 comprises between about 50 wt % and about 70 wt % cationic polymer 102 and between about 30 wt % and about 50 wt % cationic surfactant 104. In one specific example, the composition 100 may comprise about 60% cationic polymer 102 and about 40% cationic surfactant 104. In other embodiments, the composition 100 comprises between about 30 wt % and about 50 wt % cationic polymer 102 and between about 50 wt % and about 70 wt % cationic surfactant 104. In another specific example, the composition 100 may comprise about 40% cationic polymer 102 and about 60% cationic surfactant 104.

In some embodiments, the ratio of the cationic surfactant 104 to the cationic polymer 102 is between about 1:2 and about 2:1 on a ppm basis in the water being treated, or more particularly between about 1:1.5 and about 1.5:1. The proportion and ratio of the cationic surfactant 104 and the polymer 102 may be selected based on the properties of the water being treated, as discussed in more detail below.

Also provided herein is a kit for water treatment. The kit may comprise a cationic polyacrylamide-type polymer and a cationic surfactant. The cationic polymer and the surfactant may be any embodiments of the cationic polymer 102 and the cationic surfactant 104 of the composition 100 as described above. In some embodiments, the kit comprises the cationic polymer and the cationic surfactant in the same container. In other embodiments, the kit may comprise the cationic polymer and the cationic surfactant in different containers. In some embodiments, the kit further comprises instructions for using the polymer and surfactant to treat contaminated fluid such as instructions for performing the method 200 of FIG. 2 as described below.

Figure 2:
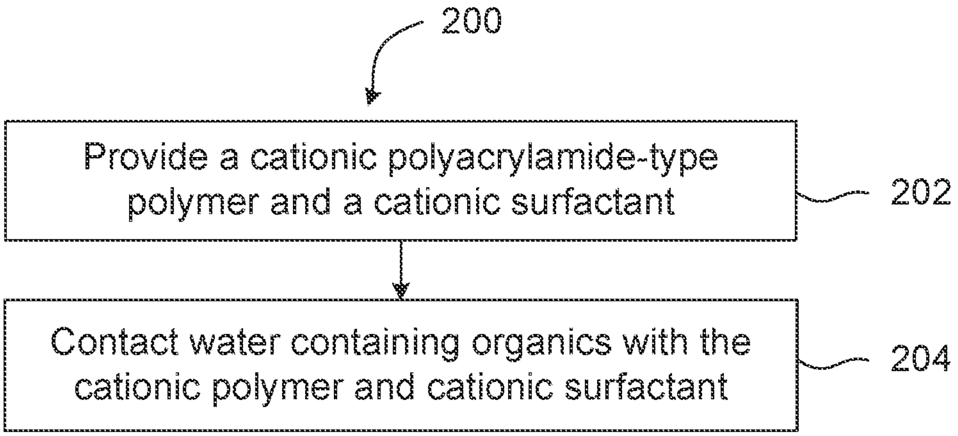
FIG. 2 is a flowchart of an example method for treating a contaminated fluid, according to some embodiments.

FIG. 2 is a flowchart of an example method 200 for treating water containing organic matter, according to some embodiments. In this example, the water to be treated is in the form of an oil-in-water emulsion comprising both dispersed oil and dissolved organics (e.g. hydrocarbons).

At block 202, a cationic polyacrylamide-type polymer and a cationic surfactant are provided. The term "providing" or "provide" in this context refers to making, acquiring, purchasing, or otherwise obtaining the polymer and the surfactant. The polymer and the surfactant may be any embodiments of the cationic polymer 102 and the cationic surfactant 104 as described above. The polymer and the surfactant may be provided as a single composition (e.g. as the composition 100 of FIG. 1) or may be provided separately (e.g. as the kit described above).

The dosages of the polymer and surfactant may be selected based on at least one property of the water being treated including, but not limited, to: zeta potential of the oil-in-water emulsion, total oil content, oil droplet size, concentration of dissolved organics, total volume of fluid to be treated, and any other relevant property.

In some embodiments, the dosages of the polymer and surfactant are determined based on the isoelectric point (IEP) of the water being treated i.e. the minimum dosages that bring the zeta potential of the water to approximately zero (hereafter referred to as the "IEP dosage"). The IEP dosages of the polymer and the surfactant may be determined based on experimental tests on a sample of the water to be treated or may be based on previous data or modeling of the same or similar water. In some embodiments, the dosages of the polymer and surfactant may be approximately the IEP dosages (e.g. within about ±10%). In other embodiments, the dosages may be within a suitable range around the IEP dosage, for example, about ±50% of the IEP dosage. In some embodiments, the dosage may be selected based on the type of emulsion (e.g. SAGD Produced Water vs. Emulsion in the Examples below).

Alternatively, or additionally, the dosages of the polymer and surfactant may be determined based on the total oil content of the water phase, the oil droplet size, and/or the concentration of dissolved organics in the water to be treated. As demonstrated in the Examples below, lower dosages may be more suitable for emulsions with high total oil content (up to about 7000 ppm TOC) and relatively larger drop sizes (e.g. a mean drop size of 10 microns). At significantly higher dosages, the oil droplets may re-stabilize, thereby preventing complete oil-water separation. In these embodiments, the dosage of the polymer and the surfactant may each be between about 1 ppm and about 30 ppm, between about 1 ppm and 20 ppm, or between about 5 ppm and about 15 ppm. As one specific example, the dosage of the surfactant may be about 8 ppm and the dosage of the polymer may be about 11 ppm.

On the other hand, higher dosages may be more suitable for emulsions with higher concentrations of dissolved organics and smaller droplet size (e.g. <2 microns), such that the oil droplets are very stable and more difficult to destabilize. In these embodiments, the dosage of the polymer and the surfactant may each be between about 1 ppm and about 150 ppm, between about 40 ppm and 120 ppm, or between about 50 ppm and about 100 ppm. As one specific example, the dosage of the surfactant may be about 92 ppm and the dosage of the polymer may be about 53 ppm.

Although generally, the dosage of the polymer and the surfactant are each relatively low (e.g. less than about 150 ppm, less than about 120 ppm, or less than about 100 ppm), higher doses may be required depending on the properties of the water being treated.

The ratio of the surfactant to the polymer may also be selected based on the total oil content of the oil-in-water emulsion. In some embodiments, the ratio of surfactant to polymer to oil content is between about 1:1:1000 and about 2:1:100 on a ppm basis. Increasing the proportion of the surfactant in emulsions with lower oil content may help to promote coalescence of oil droplets, as described in more detail below with respect to FIG. 3.

At block 204, the water is contacted with a cationic polyacrylamide-type polymer and a cationic surfactant. The term "contact" in this context is intended to include any means by which the polymer and surfactant are brought into contact with the water. In some embodiments, the polymer and the surfactant are added to the water. In alternative embodiments, the water may be flowed through the polymer/surfactant, for example, by embedding the polymer and surfactant (single component or mixture) in a filter or other solid support.

In some embodiments, the polymer and the surfactant are combined prior to contacting the water (e.g. when the polymer and surfactant are provided as a single composition). In other embodiments, the polymer and surfactant contact the water separately (e.g. when the polymer and surfactant are provided separately in a kit). In embodiments in which the polymer and surfactant are separate, the polymer and surfactant may be added to the water simultaneously or sequentially.

Contact between the polymer/surfactant and the water at least partially separates ("extracts") the organic matter from the rest of the water. In embodiments in which the water is an oil-in-water emulsion, contact between the polymer/surfactant and the water may facilitate the separation of the emulsion into an oil-rich phase and a water-rich phase. In some embodiments, the separated oil-rich phase may contain all or almost all of the dispersed and dissolved organics originally present in the emulsion, for example at least 95%, at least 99%, at least 99.5%, or at least 99.9% of the organics. In some embodiments, less than about 10 ppm or 10 mg/L total oil may remain in the water phase. The remaining oil droplets in the water phase may be relatively small, such as less than 2 micron, or less than 1 micron in size.

In some embodiments, the polymer and the surfactant are mixed with the water being treated to facilitate separation of the organic matter from the rest of the water (e.g. to facilitate phase separation of the oil-rich phase and the water-rich phase). The polymer and surfactant may be mixed with the water by any suitable means such as stirring, inverting, etc. The mixing may be relatively gentle or may be more vigorous. In some embodiments, the water/polymer/surfactant mixture is continuously mixed over a period of time. It will be understood that "continuously" in this context refers to approximate continuity, although minor interruptions are possible. As discussed in the Examples below, continuous gentle mixing appears to improve phase separation. The water/polymer/surfactant may be continuously mixed for 30 minutes or more, 1 hour or more, 6 hours or more, or 20 hours or more, etc. depending on the volume of the water to be treated.

In other embodiments, water/polymer/surfactant may be mixed intermittently such as, for example, once every few minutes, every half hour, every hour, etc. In yet other embodiments, the polymer and surfactant may be initially mixed with the water and then the water/polymer/surfactant mixture is allowed to "sit" (i.e., equilibrate for phase separation) for a suitable period of time to allow phase separation. The water/polymer/surfactant may be allowed to equilibrate for phase separation for 30 minutes or more, 1 hour or more, 6 hours or more, or 20 hours or more, etc.

In some embodiments, the method 200 further comprises removing at least a portion of the separated organic matter from the rest of the water. In embodiments in which the water is an oil-in-water emulsion, the separated oil-rich phase may comprise flocs and/or larger droplets, which may form a layer of free oil at the top surface of the treated water. In these embodiments, the method 200 further may comprise removing at least a portion of the oil-rich phase from the water-rich phase via skim tanks or any other suitable technique. In some embodiments, the remaining oil in the water phase may be managed with a water treatment unit such as an air flotation vessel.

Figure 3:
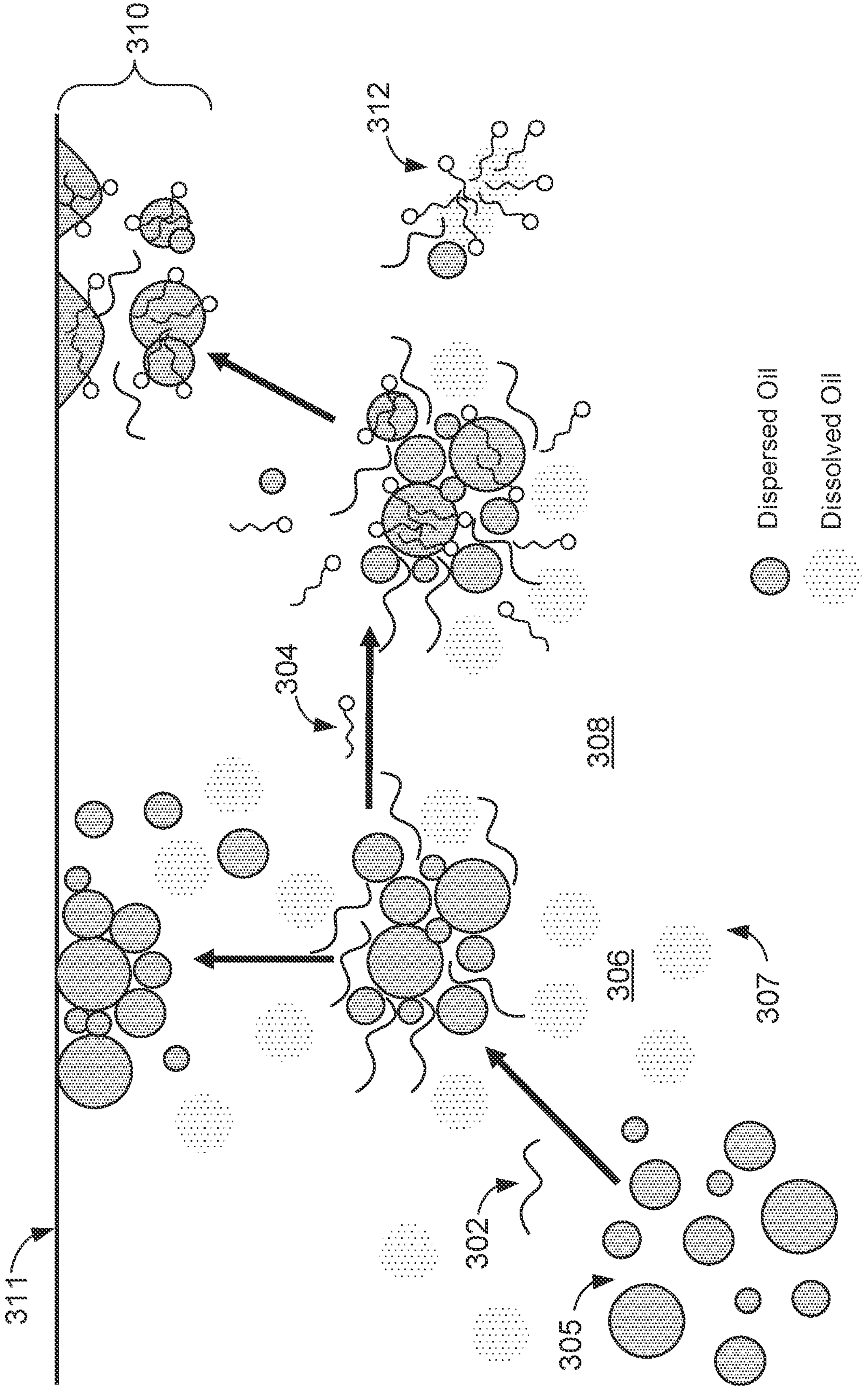
FIG. 3 is a schematic of a proposed mechanism of the composition and method of FIGS. 1 and 2.

FIG. 3 is a schematic showing a proposed mechanism by which a combination of a cationic polymer 302 and a cationic surfactant 304 are used to treat contaminated fluid. In this example, the contaminated fluid is an oil-in-water emulsion comprising oil 306 in the form of dispersed oil droplets 305 and dissolved organics 307 in water 308. The cationic polymer 302 and cationic surfactant 304 may both contribute to neutralizing the negative surface charge on the oil droplets 305 to promote emulsion destabilization and phase separation. As shown in FIG. 3, the cationic polymer 302 is believed to promote flocculation of the oil droplets 305. The cationic surfactant 304 may adsorb on the surfaces of the oil droplets 305 and modify the oil/water interfacial properties to promote drop coalescence. The coalesced droplets form free oil 310 that floats at the water surface 311.

Without being limited by theory, the extraction of the dissolved organics 307 is believed to occur by one or both of the following mechanisms:

1) Shifting of the equilibrium from the dissolved state to the dispersed state on extraction of the dispersed phase (i.e. upon flocculation and coalescence of the dispersed oil droplets 305). The dissolved organics 307 thereby shift into the dispersed state and are extracted by flocculation and coalescence in a similar manner to the oil droplets 305.
2) Micellar extraction in which the dissolved organics 307 transfer from the water phase 308 into mixed micelles 312. The micelles 312 may be formed from the surfactant 304 and the polymer 302 in the presence of natural soluble surfactants that are often present in contaminated waters, such as SAGD produced water.

It is hypothesized that micellar extraction of the oil phase is likely a secondary mechanism that commences at low oil concentrations to further reduce the oil content. However, micellar extraction may be the dominant mechanism for contaminated waters with high surfactant concentrations.

As demonstrated in the Examples below, the compositions and methods disclosed herein have been found to destabilize oil-in-water emulsions and capture fine droplets as well as remove at least a portion of the dissolved organics. In some embodiments, the total oil content in the water can be reduced to less than 1% (and in some cases less than 0.1%) of the original oil content without additional treatments. This treatment strategy may therefore be more cost-effective and less energy-intensive than conventional water treatments for industrial wastewater.

The compositions, kits, and methods described above may be used to treat various types of contaminated fluids from a variety of industries. In some embodiments, the contaminated fluid is water contaminated with oil and/or grease. The total oil/grease content in the water may be greater than about 200 ppm or between about 200 ppm and about 10,000 ppm. The compositions, kits, and methods are particularly well-suited for treating contaminated waters that contain a combination of dispersed and dissolved oil and/or other organic matter.

In some embodiments, the contaminated fluid is produced water from an oil recovery process. In some embodiments, the oil recovery process is a thermal oil recovery process that involves injection of a heated vapor-phase working fluid into a viscous oil reservoir to mobilize the viscous oil (e.g., bitumen, heavy oil) therein such that the oil is displaced to a production well and produced to surface. The heated working fluid may comprise steam. In some embodiments, the working fluid comprises a mixture of steam and one or more solvents. In some embodiments, the working fluid may further comprise one or more steam additives such as polymers and surfactants. Non-limiting examples of thermal oil recovery processes include Steam Assisted Gravity Drainage (SAGD), Cyclic Steam Stimulation (CSS), and Steam Flooding.

In some embodiments, the produced water has been processed to partially separate the water from the oil and other components such as gas (hereafter referred to as "process water"). For example, the process water may have passed through a slug catcher and/or free water knockout (FWKO) vessel after it is received from the production well. In some embodiments, the process water has undergone de-oiling, for example, via one or more skim tanks.

SAGD produced water and process water may each be in the form of an oil-in-water emulsion containing dispersed and dissolved organic matter including the oil, solvents and/or other additives if used, and possibly other natural organic matter from the reservoir. Major hydrocarbon groups typically present in SAGD produced and process water include alkanes, alkynes, aromatics, alkene, polynuclear aromatics, and complex hydrocarbons containing oxygen, nitrogen, and sulfur such as asphaltenes, etc. SAGD produced water/process water tends to have a negative zeta potential owing to the negative surface charges of the oil droplets.

Treatment of SAGD produced water, process water, or other emulsions allows the treated water to be re-used for steam generation, for example, as feedwater for a Once Through Steam Generator (OTSG). The total oil content limit for OTSG is typically less than 10 mg/L or less than 10 ppm. Alternatively, the treated water may be released into the environment.

In other embodiments, the contaminated fluid may be process water or wastewater an industrial process. For example, the contaminated fluid may be wastewater from the coal gasification industry. Wastewater generated during production of syngas may contain a variety of harmful and toxic chemicals such as phenols, polycyclic hydrocarbons, and long-chain hydrocarbons. Treatment of this wastewater may allow the water to be re-used or discharged.

In other embodiments, the contaminated fluid may be process water or wastewater from the food industry. For example, edible oils like palm oil are extracted from various parts of the palm plant and the water used in the extraction process can become contaminated with oil. Treatment of the oily wastewater may prevent clogging of pipelines and fouling of equipment.

As another example in the food industry, the contaminated fluid may be water used to wash equipment and surfaces in food processing operations. Processing of meat, fish, and other foods involves slaughter, grinding, and cooking processes that generate fat and oil as by-products. Industry regulations require that equipment and facilities be kept clean, prompting routine washing of oily surfaces and producing oily wastewater. Treatment of this water may allow it to be reused or discharged.

In other embodiments, the contaminated fluid may be wastewater discharge from the pharmaceutical industry. Treatment of pharmaceutical wastewater to remove organics may prevent those organics from polluting lakes and other bodies of water.

Other examples of oily process and wastewaters are described in Kajitvichyanukul, P., Hung, Y T., Wang, L. K. (2006) "Oil Water Separation" in: Wang, L. K., Hung, Y T., Shammas, N. K. (eds) *Advanced Physicochemical Treatment Processes. Handbook of Environmental Engineering*, vol 4. Humana Press, USA, incorporated herein by reference.

In other embodiments, the contaminated fluid may be any other type of contaminated fluid and embodiments are not limited to only the specific fluids described herein. Although the majority of the examples provided above are contaminated waters, treatment of other types of fluids is contemplated including industrial solvents, alcohols, organic waste from the pharmaceutical industry, etc.

Without any limitation to the foregoing, the compositions, kits, and methods are further described by way of the following examples.

Example 1—Synthetic Oil-in-Water Emulsion Experiments

Example 1.1—Production and Characterization of Synthetic Oil-in-Water Emulsion Diluted-bitumen-in-water (1 wt %) emulsion samples, similar to SAGD produced water emulsions, were synthesized at laboratory conditions by emulsifying dilute bitumen ("dilbit"; bitumen/hexanes=80/20 w/w) in deionized water. Ultrasonication at high amplitude caused the emulsion temperature to rise to around 60° C. but at the same time was able to produce a fine emulsion with dilbit droplets homogenously dispersed in a water-continuous phase. The prepared oil-in-water emulsion was then carefully transferred to a 200 mL glass bottle fitted with a magnetic stirrer to keep the emulsion well dispersed. The emulsion was stirred at low rotation setting (<100 rpm) on a stirrer plate until used for further testing.

A portion of the prepared emulsion (original) was characterized in terms of the particle size distribution, ("PSD"; Acoustics Spectrometer, Dispersion Technologies™, USA), zeta potential (Dispersion Technologies™, USA), turbidity (HACH™ Turbidity Meter, USA) and total oil content (tetrachloroethylene solvent with FT-IR, InnoTech Alberta™, Canada).

Example 1.2 Identification of Cationic Surfactants and Cationic Polymers for Testing A set of laboratory grade cationic surfactants were identified for emulsion de-stabilization tests. 1-butyltriethylammonium bromide ("BtyTA"; Alfa Aesar™; MW 238.21 g/gmol) and 1-hexadecyltrimethylammonium bromide ("HexDA"; Alfa Aesar; MW 364.46 g/gmol) surfactants were prepared in 0.01 M concentrations and used as additives to the lab-synthesized oil-in-water emulsions. Solutions of cationic polymers C2019 (C10%, $600\times10^4$ g/gmol, Greatwin China™), C4039 (C20%, $700\times10^4$ g/gmol, Greatwin China), C6049 (C30%, $800\times10^4$ g/gmol, Greatwin China) and C8049 (C40%, $900\times10^4$ g/gmol, Greatwin China) were prepared in concentrations of $6\times10^{-7}$ M, $2.6\times10^{-7}$ M, $1.1\times10^{-7}$ M, and $1.0\times10^{-7}$ M, respectively and used as co-additives to the oil-in-water emulsion. Several formulations of surfactant-only, polymer-only, and surfactant-polymer mixture formulations were tested on synthesized oil-in-water emulsions for emulsion de-stabilization tendency and oil-water separation efficiency.

Example 1.3—Emulsion Treatment and Testing Procedures

Isoelectric Point Determination and Selection of Additives and Dosages

The effectiveness of respective cationic surfactants, cationic polymers, and cationic formulations to separate oil from water-continuous emulsion was tested through a series of IEP (isoelectric point) tests. IEP tests were carried out by taking a 10 ml of oil-in-water emulsion and adding few mL of additive solution (prepared earlier) to it. Additive dosage was then gradually increased until the zeta potential of the mixture became nearly zero or positive (measured in mV). The additive dosage to reach IEP is referred to as the "IEP dosage" and is the minimum dosage required to neutralize the negative charge on the oil droplets present in the water phase. The IEP dosages for each of the surfactants, polymers and formulations were measured and the candidates that required the lowest dosages to reach IEP were shortlisted for further testing.

Separation Tests

Oil-water separation and destabilization tests were carried out using an acoustic spectrometer (Dispersion Technologies™, USA). These tests included addition of pre-determined IEP dosages of additives/formulations to the oil-in-water emulsion (110 mL sample) under gentle mixing conditions, and tracking changes in the zeta potential and PSD of the emulsion (if any) for a total of >6 hours, until an equilibrium was established.

Stability Tests

The most effective additives/formulations were tested for their de-stabilization effect on synthetic o/w emulsion (20 mL sample) under normal gravity settling conditions using a Turbiscan™ (Formulaction™, France). The procedure involved pipetting a 20 mL emulsion sample into a glass vial and gently adding an additive to it. The mixture was then gently shaken to disperse the additive into the oil-in-water emulsion. The mixture was then promptly transferred to the Turbiscan and laser scanned from top to bottom for any changes in transmitted or backscattered light. Transmitted (T %) and backscattered light (BS %) was detected and analyzed to create a series of stability profiles of the sample. A stability index (Turbiscan stability/separation index) based on the light measurements was also reported to compare various additives and formulation schemes.

Water and Oil Phase Characterization and Analysis

De-stabilized emulsion samples were prepared by adding IEP dosage(s) of additive(s) to 126 mL of an emulsion which was allowed to stir on a magnetic stirrer (3 cm bar) for over 10 hours under gentle mixing conditions (≈300 rpm). The oil and water phases were gently decanted post-mixing step and stored for further analysis.

PSD Tests and Micrographs

Drop size distribution of dispersed oil droplets in the treated water phase was measured by electroacoustic spectrometer (Dispersion Technologies™, USA) and with a high-sensitivity light microscope (Carl Zeiss™, Germany).

Total Oil Content (Solvent and TOC)

Total oil content in the separated water phase was determined by a solvent-based method (tetrachloroethylene solvent with FT-IR, InnoTech Alberta™, Canada). Typical detection limit for the solvent method was 0.5 μg/mL (0.5 ppm). Total organic carbon was determined by TOC analyzer (Shimadzu™, TOC-L CPH/CPN, USA) by oxidation of organic carbon to carbon dioxide. The TOC-L series employs a 680° C. combustion catalytic oxidation method with a detection limit of 4 μg/ml (4 ppm). The combustion catalytic oxidation method made it possible to efficiently oxidize low-molecular-weight organic compounds as well as insoluble and macromolecular organic compounds.

Dispersed and Non-Dispersed Oil Content in Synthetic Water

Ultracentrifugation of synthetic water was carried out on Beckmann Coulter™ at 40,000 rpm over a test period of 24 hours. The g-force was around 163,000×g which was sufficient to separate the dispersed phase droplets >50 nm size.

Naphthenic Acid and Total Acid Content

Naphthenic Acid (NA) content in the separated water phase was carried out by HPLC-Orbitrap-MS technique while the total acid number (TAN) was determined by alkali KOH titration (ASTM D664) method. Light hydrocarbon concentration (up to C9) in the water phase was determined by gas chromatography (ASTM D7900).

Turbidity Measurement

Turbidity measurements on the separated water phase were carried out on a Hach™ Turbidity Meter (USA) with a 690 nm light source while water phase stability (sedimentation/creaming) was monitored by 880 nm (n-IR) light source using Turbiscan™ (USA).

Example 1.4—Base Emulsion Characterization Results

Figure 4B:
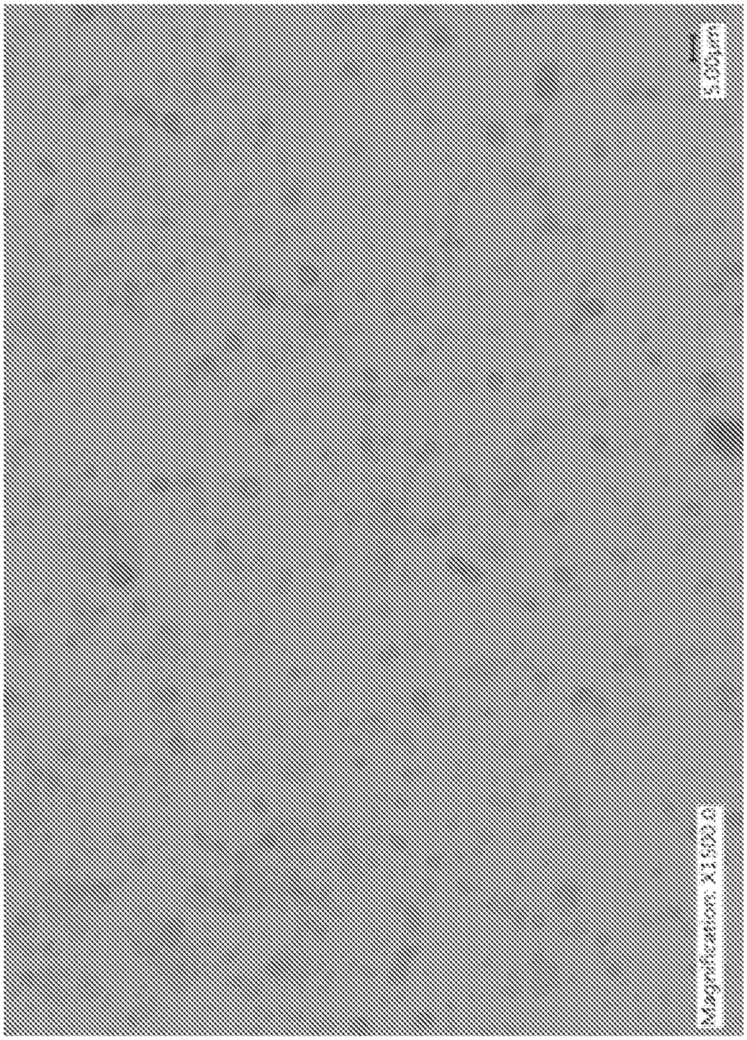
FIGS. 4A and 4B are photographs showing the physical appearance of a fresh lab-synthesized oil-in-water emulsion (diluted-bitumen-in-water with 1 wt % oil) in bulk and under an optical microscope, respectively. The line in the bottom right corner represents the scale of 5.00 μm in drop size.
Figure 4A:
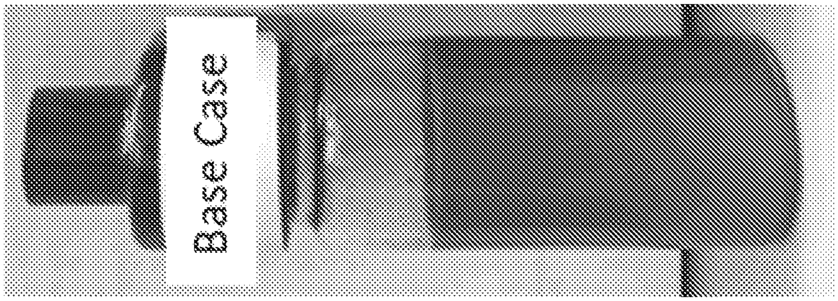

Synthesized oil-in-water emulsion samples were characterized in terms of zeta potential of the dispersed phase, total oil content, turbidity, and mean drop size. FIGS. 4A and 4B shows the physical characteristics of the synthesized emulsion. The measured parameters are summarized in Table 1 for a dispersed phase concentration of 1 wt %. This sample was then set aside and treated with cationic surfactants, cationic polymers, and/or cationic formulation(s) to study the oil-water separation kinetics and characteristics.

TABLE 1

Measured characteristics of fresh oil-in-water synthesized emulsion (at RT, ~23° C.)

| Total oil content (ppm) | Zeta potential (mV) | Turbidity (NTU) | Mean drop size (microns) | TAN (mg KOH/mg) | NA (μg/L) |
|---|---|---|---|---|---|
| 7736-8800 (SolEx)<br>5460-5518 (TOC)<br>2.5 wt % (<C9) | −38 ± 14 | >10,000 | 10 ± 2 | 0.14 | 5410 |

SolEx = solvent extraction (tetrachloroethylene);
TOC = total organic carbon;
TAN = total acid number;
NA = Naphthenic Acid (131 types of carboxylic/naphthenic acid species were analyzed),
RT = Room Temperature.

Example 1.5—Isoelectric Point Determination Results

Figure 5A:
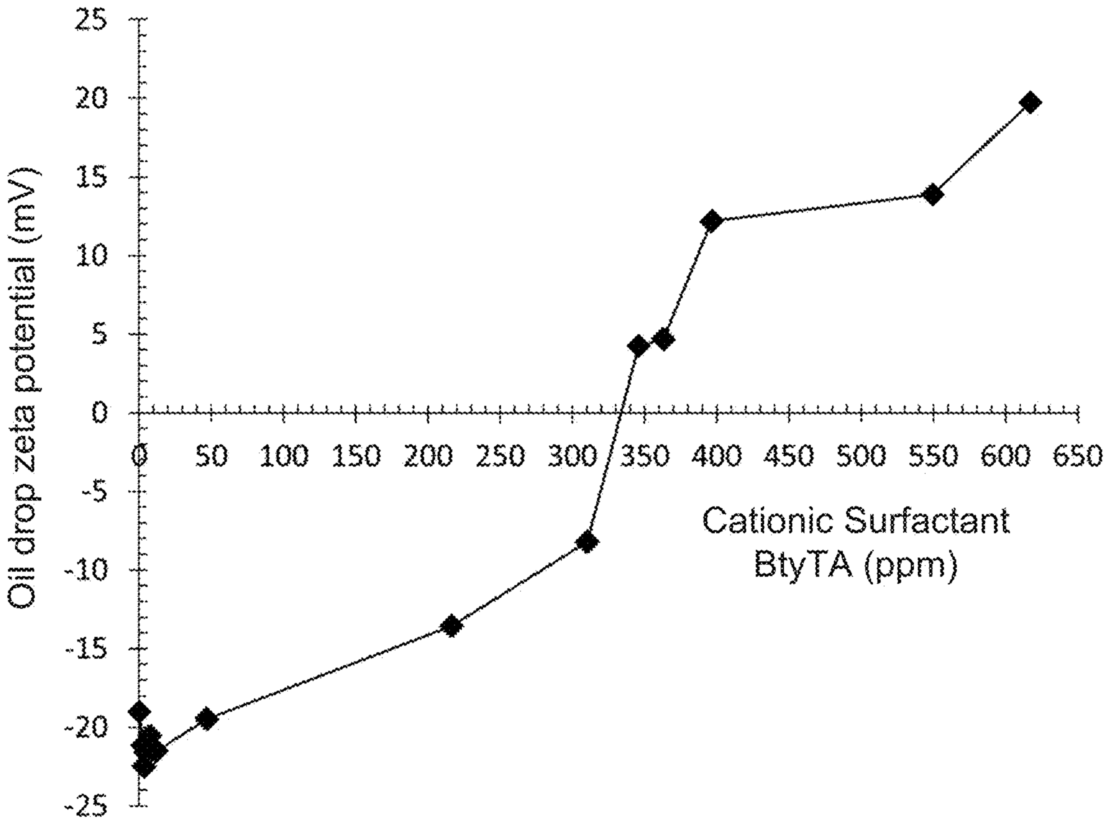
FIGS. 5A and 5B are graphs showing isoelectric point (IEP) determination for lab-synthesized emulsion treated with 1-butyltriethylammonium bromide (BtyTA) and 1-hexadecyltrimethylammonium bromide (HexDA) surfactant, respectively.
Figure 5B:
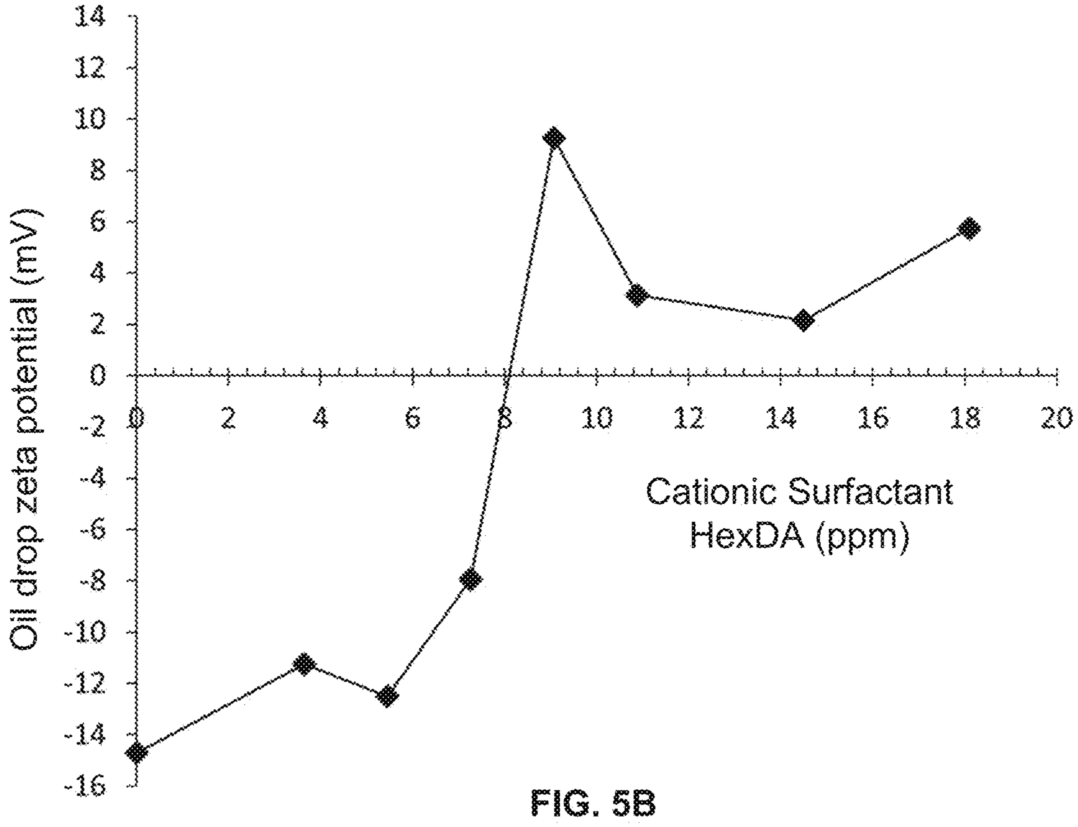
Figure 6A:
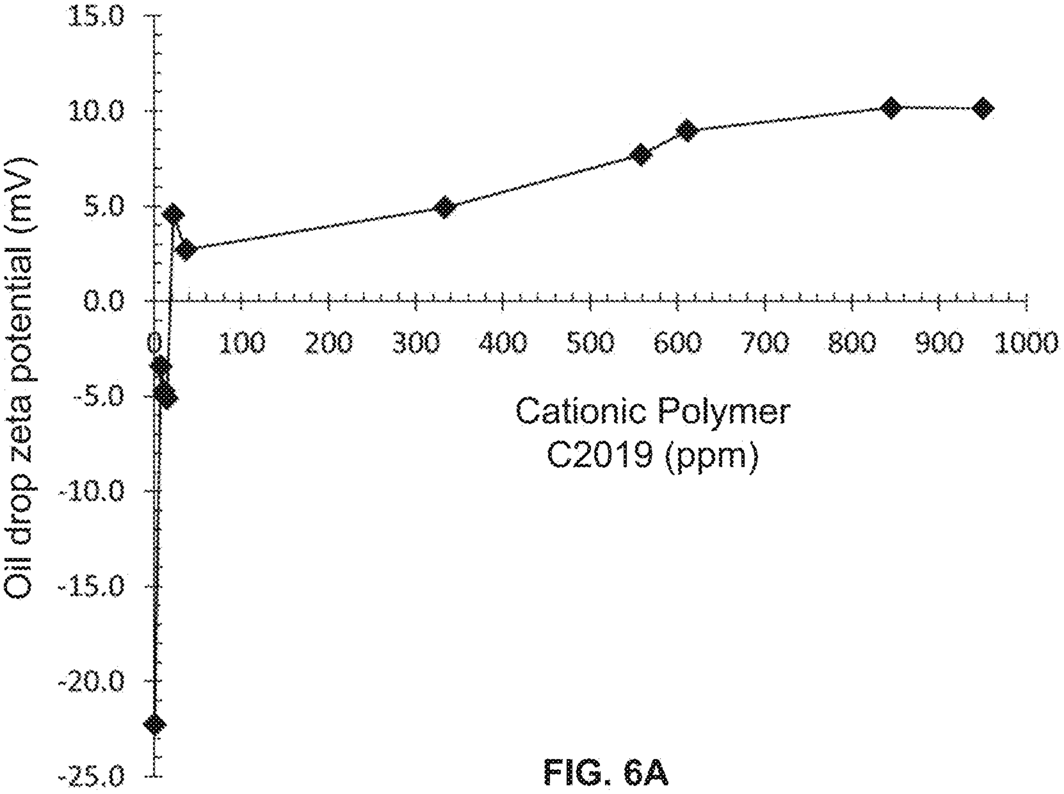
FIGS. 6A to 6D are graphs showing isoelectric point (IEP) determination for fresh lab-synthesized oil-in-water emulsion treated with C2019, C4039, C6049, and C8049 polymers, respectively.
Figure 6B:
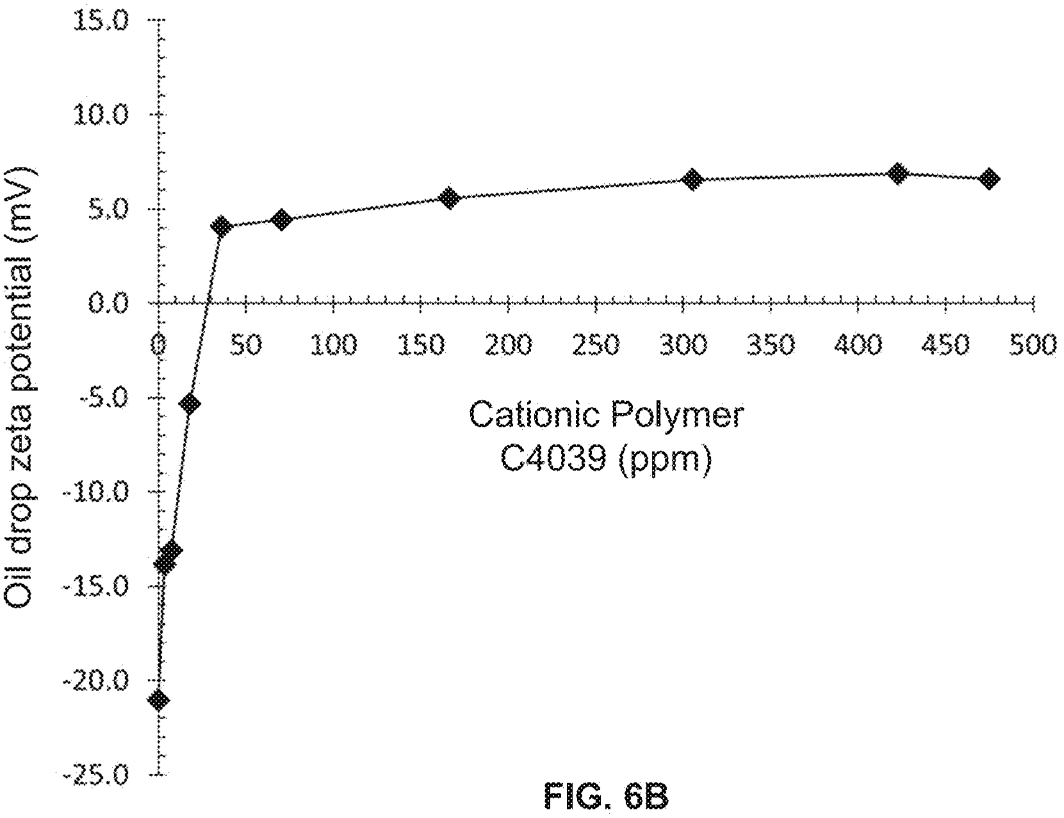
Figure 6C:
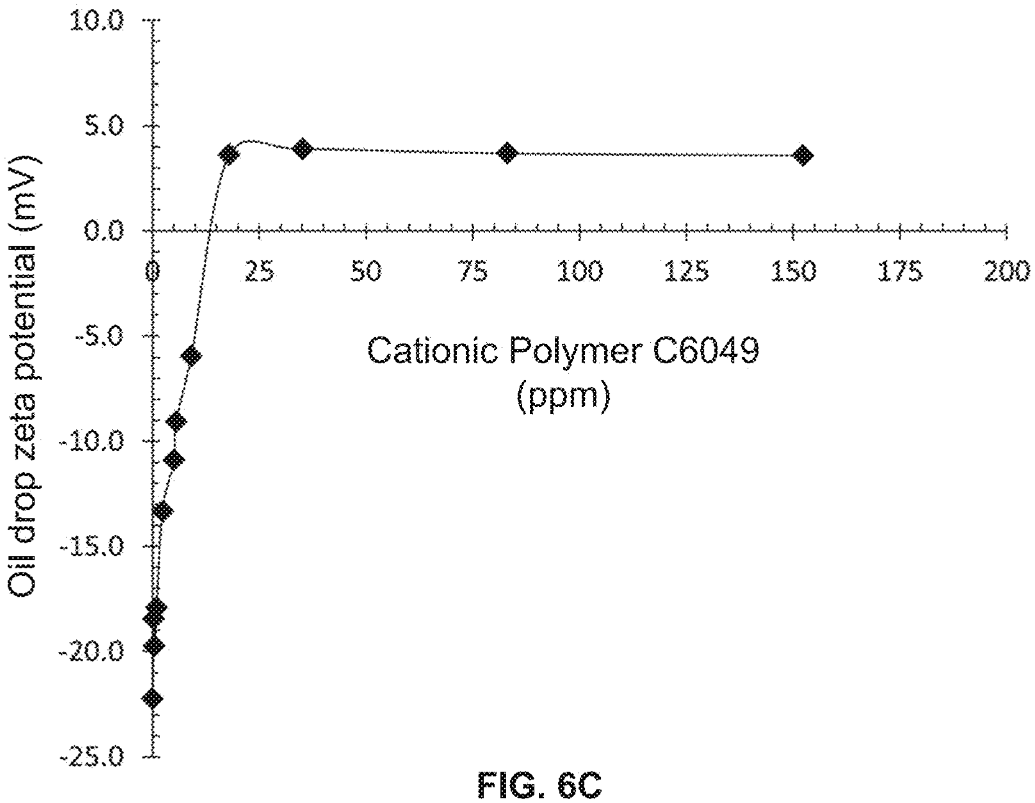
Figure 6D:
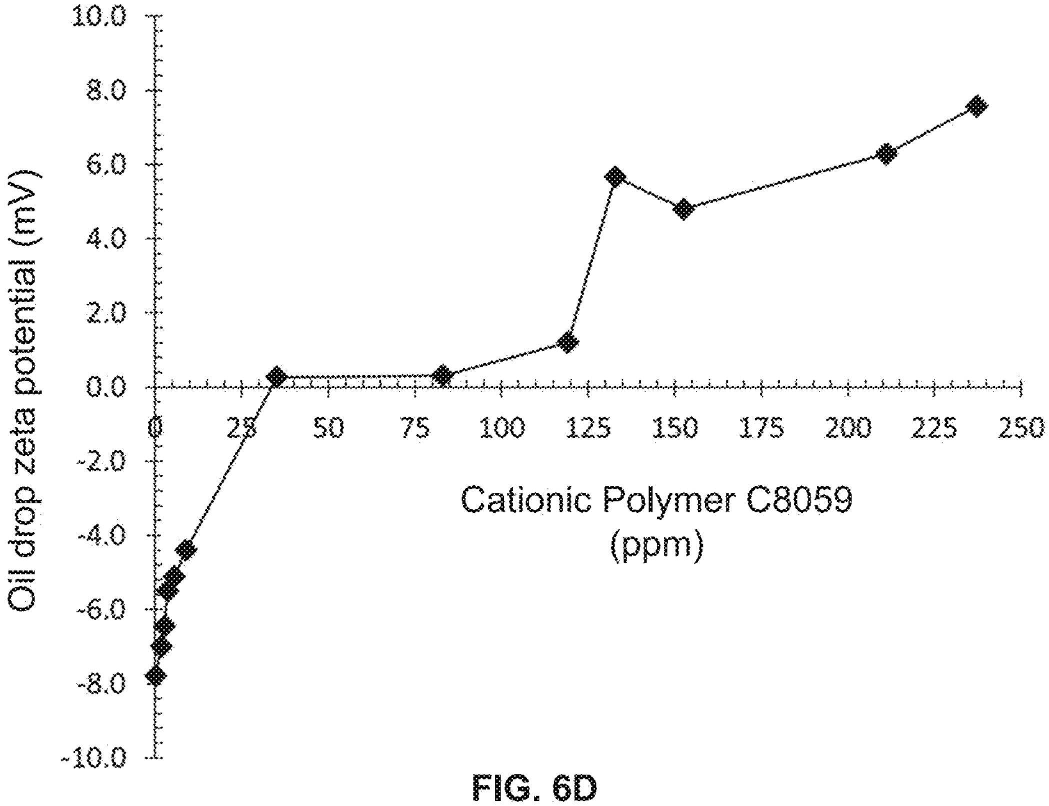
Figure 6E:
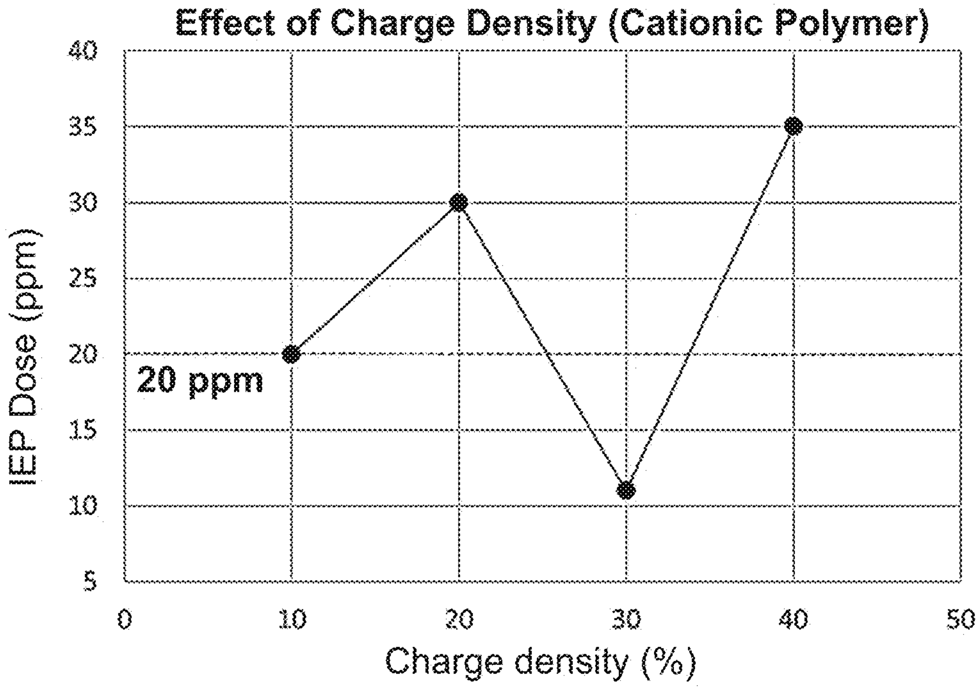
FIGS. 6E and 6F are graphs showing the effects of charge density and molar mass of the C2019, C4039, C6049, and C8049 polymers, respectively, on IEP dosage.
Figure 6F:
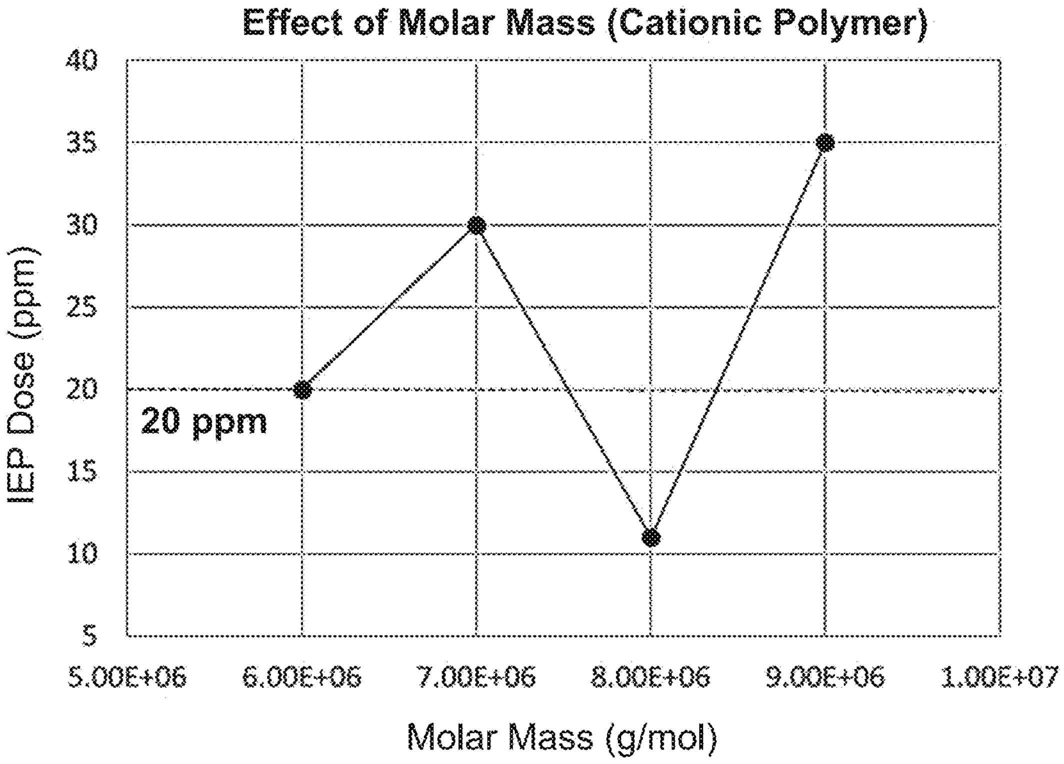

A sample of the synthetic oil-in-water emulsion was gently mixed with the cationic additives and the resulting zeta potential of the emulsion was recorded. This was carried out to estimate an "IEP dosage" of the additive that is just enough to neutralize the surface charge on the negatively charged (−38±14 mV) dispersed oil droplets. The results of the IEP determination tests for the cationic surfactants are shown in FIGS. 5A and 5B and the results for the polymers are shown in FIGS. 6A to 6D. In these Figures, the x-coordinate where the graph crosses the X-axis is the minimum dosage required to reach IEP=0 (i.e. the IEP dosage). Following this procedure, the corresponding IEP dosages for cationic BtyTA, HexDA, C2019, C4039, C6049 and C8049 were found to be approximately 325, 8, 20, 30, 15, and 35 ppm, respectively. FIGS. 6E and 6F summarize the effects of the charge density and molar mass of the polymer, respectively, on the IEP dosage. All polymers tested (C2019, C4039, C6049 and C8049) achieved IEP dosages of less than 35 ppm.

Figure 7:
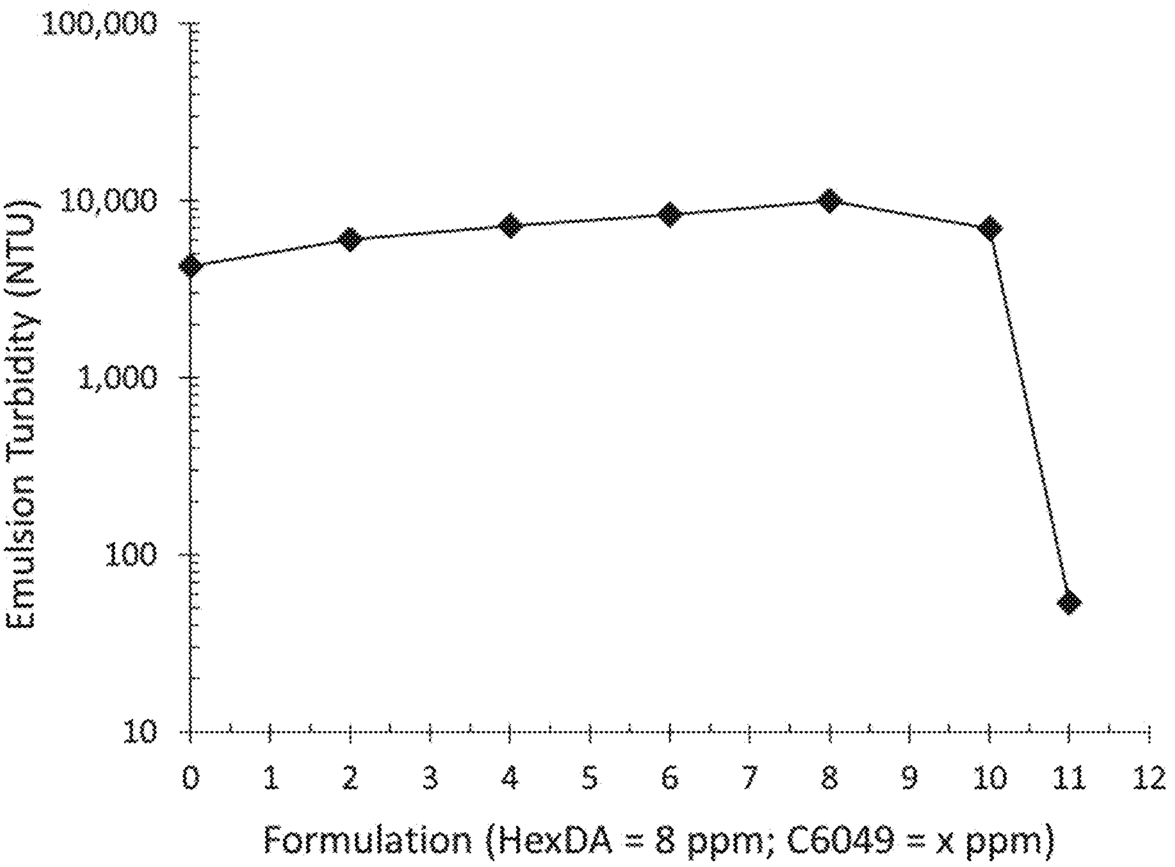
FIG. 7 is a graph showing turbidity change determination for fresh lab-synthesized oil-in-water emulsion treated with a combination of HexDA (8 ppm) and varying amounts of C6049.

Cationic HexDA and polymer C6049 required the lowest dosages to reach IEP≥0 and hence were chosen for further testing. The effectiveness of a HexDA and C6049 formulation was tested by adding the formulation to the oil-in-water emulsion and measuring zeta potential of the sample until the charge on the oil droplets was neutralized. FIG. 7 shows the results of the turbidity determination test for the HexDA and C6049 formulation with 8 ppm HexDA and varying amounts of C6049. The tests showed that the IEP dosage of C6049 was about 11 ppm when combined with 8 ppm HexDA as the turbidity appears to drop suddenly around those dosages.

Example 1.6—Separation Test Results

Figure 8A:
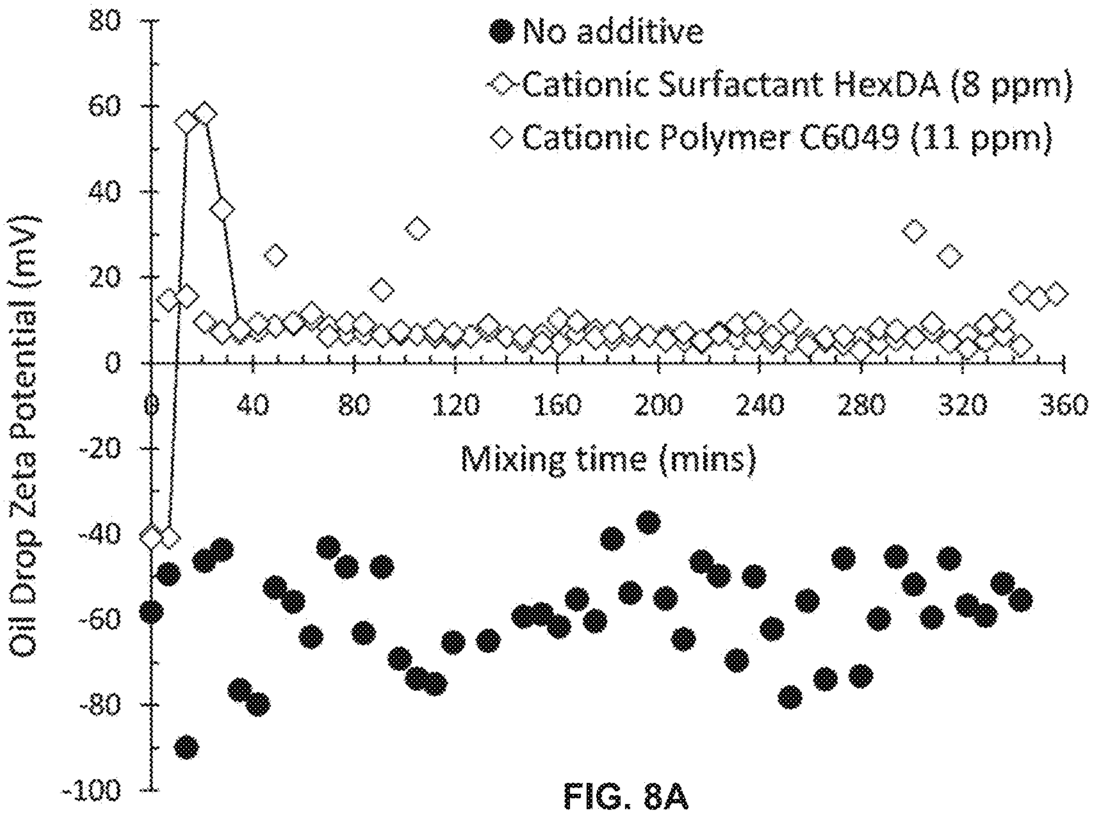
FIGS. 8A and 8B are graphs showing oil droplet zeta potential and mean droplet size, respectively, of fresh lab-synthesized oil-in-water emulsion with no additives (base emulsion) and on sequential treatment with HexDA surfactant (8 ppm) and C6049 polymer (11 ppm)
Figure 8B:
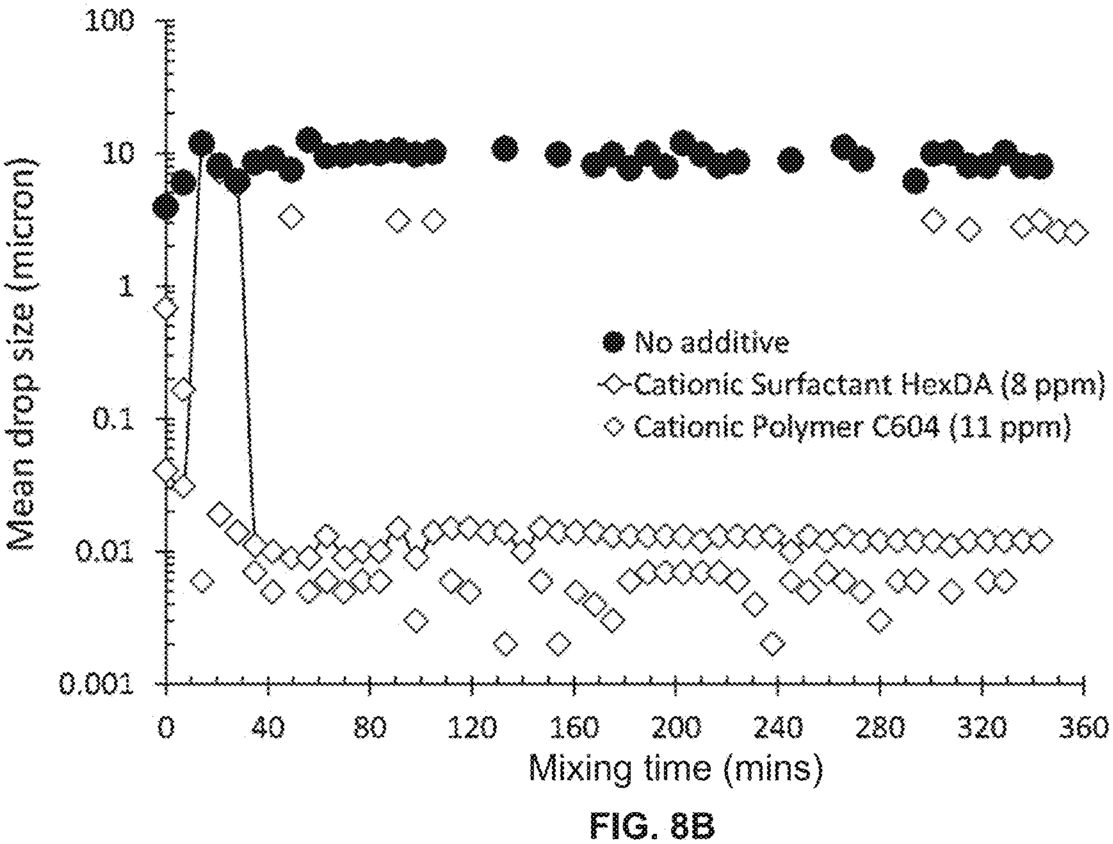

FIGS. 8A and 8B show the oil-in-water emulsion destabilization kinetics in terms of drop size and zeta potential, respectively, over time under gradual mixing conditions with the addition of HexDA surfactant only and C6049 polymer only, compared to the untreated (base) oil-in-water emulsion. For the base emulsion, the zeta potential and the mean drop size of the emulsion remained unchanged over the entire test period of 6 hours. In contrast, for the emulsions treated with surfactant or polymer, the end zeta potential was ≈+5 mV which was a significant increase from −50 mV zeta potential of the untreated emulsion. The tests showed that the cationic additives significantly altered the zeta potential (i.e. surface charge of the oil droplets) of the emulsion, therefore causing the droplets to coalesce or flocculate and phase separate. Oil phase drop sizes appeared to decrease in presence of surfactant and/or polymer, from a mean of 10±2 μm to 20 nm on addition of the surfactant, and to 10 nm on polymer addition.

Example 1.7—Stability Test Results

To test the effects of the additives on oil-in-water emulsion stability, the additives were injected into a 20 mL emulsion sample in a 30 mL glass vial and the glass vial was gently shaken for less than 5 secs to ensure mixing of the contents. This 'limited' mixing, however, was later determined to limit the performance of the additives, as discussed in more detail below. Emulsion stability was monitored by tracking the light transmitted (880 nm) and backscattered from the sample, mathematically expressed as transmittance separation index (TSI).

Figure 9:
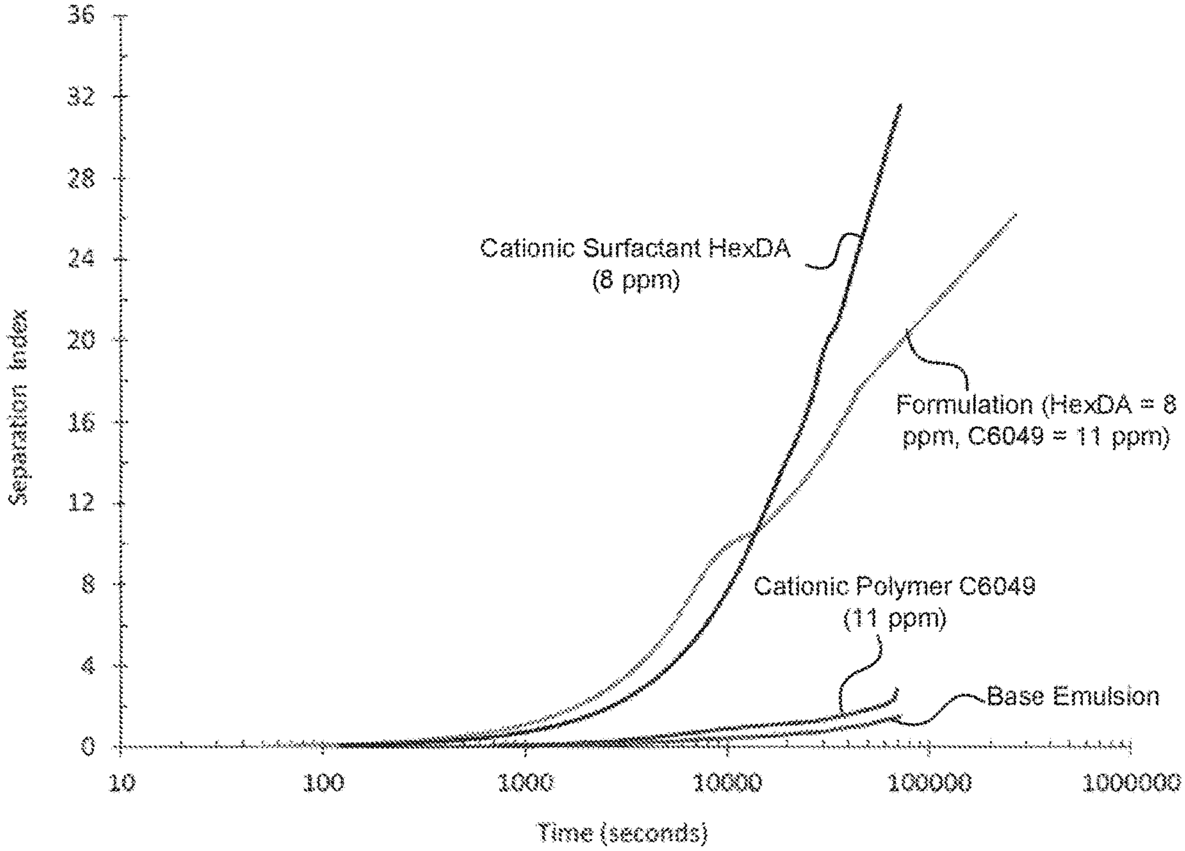
FIG. 9 is a graph showing oil-in-water emulsion stability (Turbiscan stability/separation index) of fresh lab-synthesized oil-in-water emulsion with no additives (base emulsion) and on treatment with HexDA surfactant (8 ppm), C6049 polymer (11 ppm), and cationic formulation (HexDA=8 ppm and C6049=11 ppm), under limited mixing conditions.

FIG. 9 is a graph showing a comparison between the corresponding Turbiscan separation index (TSI global index) values for the base oil-in-water emulsion, HexDA surfactant only, C6049 polymer only, and the HexDA+C6049 formulation added to an emulsion sample at t=0 hours. The TSI is a simple way to mathematically compare the intensity of the transmitted light through the complete sample-cell height (illustrated later in FIGS. 12-16), based on a scan-to-scan difference. For every scan in the history of the sample, a new point is added to its destabilization kinetics, representing the emulsion stability. As shown in FIG. 9, over a test period of 20 hours, maximum phase separation occurred in presence of the HexDA surfactant alone and the HexDA+C6049 formulation. The C6049 polymer alone had little effect on emulsion stability. It should be noted that, in Turbiscan, the emulsion-additive mixture is not continuously mixed and, thus, drop coalescence/flocculation is severely limited by the mass transfer of the additive (s) to the droplet surface (i.e. the process is diffusion-limited). Therefore, it appears that good mixing significantly improves additive performance. All other tests (i.e. other than the Turbiscan tests) were carried out under good/continuous mixing conditions.

Figure 10A:
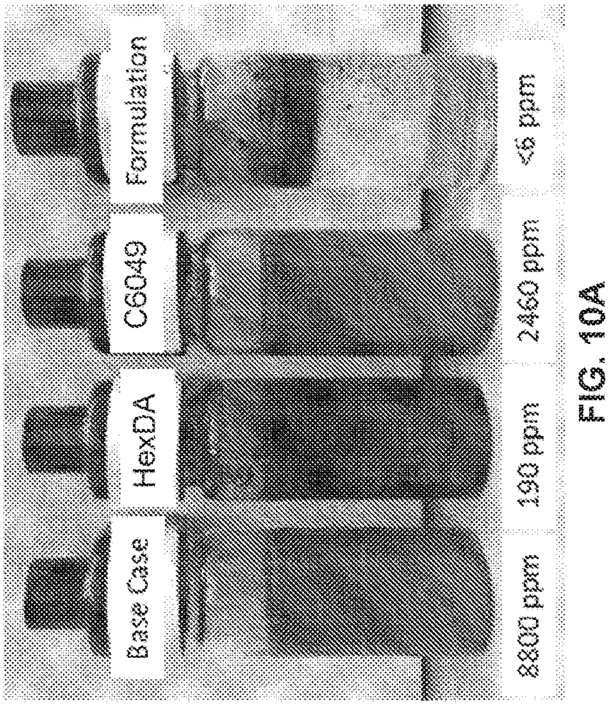
FIG. 10A is a photograph showing (from left to right): untreated fresh lab-synthesized oil-in-water emulsion ("base case" in the photograph) and the oil-in-water emulsion on treatment with HexDA surfactant (8 ppm), C6049 polymer (11 ppm), and cationic formulation (HexDA=8 ppm and C6049=11 ppm). The numbers at the bottom of the photograph refer to the total oil content of each untreated or treated emulsion sample (in ppm)
Figure 10B:
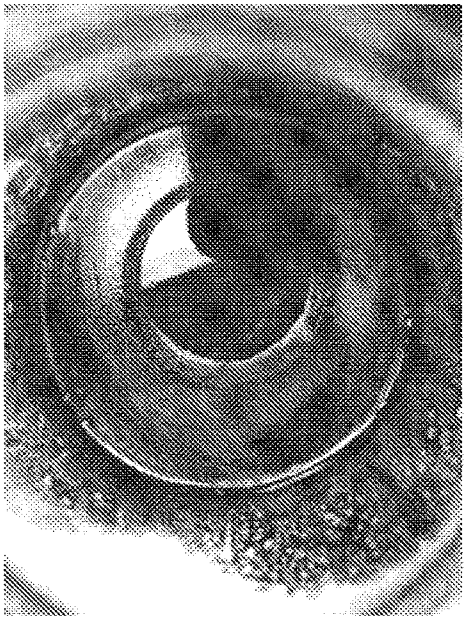
FIG. 10B is a photograph of fresh lab-synthesized oil-in-water emulsion treated with HexDA surfactant of FIG. 10A, showing free oil floating on top of the treated emulsion.

FIG. 10A is a photograph showing the oil-water phase separation process (under limited mixing conditions) at the end of a 20-hour period for HexDA surfactant only, C6049 polymer only, and the HexDA+C6049 formulation. FIG. 10B shows free oil floating at the top of the HexDA surfactant only emulsion. The surfactant alone and the HexDA+C6049 formulation appeared to perform well but the polymer alone did not. This anomaly could be due to slower diffusivity of the larger polymeric molecules to the droplet interface.

Figure 11:
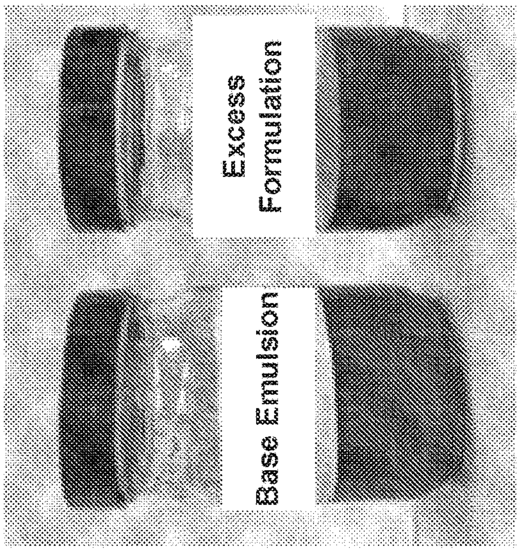
FIG. 11 is a photograph showing fresh lab-synthesized oil-in-water emulsion with no treatment (base emulsion; left) and excess cationic formulation (HexDA=24 ppm and C6049=33 ppm; right)

FIG. 11 is a photograph showing the effect of excess dosage of the HexDA+C6049 formulation well above the IEP limit (i.e. 3-times, 3× the IEP dosage; HexDA=24 ppm and C6049=33 ppm). Excess formulation appeared to decrease the oil-water separation, resulting in higher oil content remaining dispersed in the water phase at the end of the test. The high dosages were confirmed by a higher zeta potential (2.5 mV) of the water phase, which is significantly greater than the IEP.

Figure 12A:
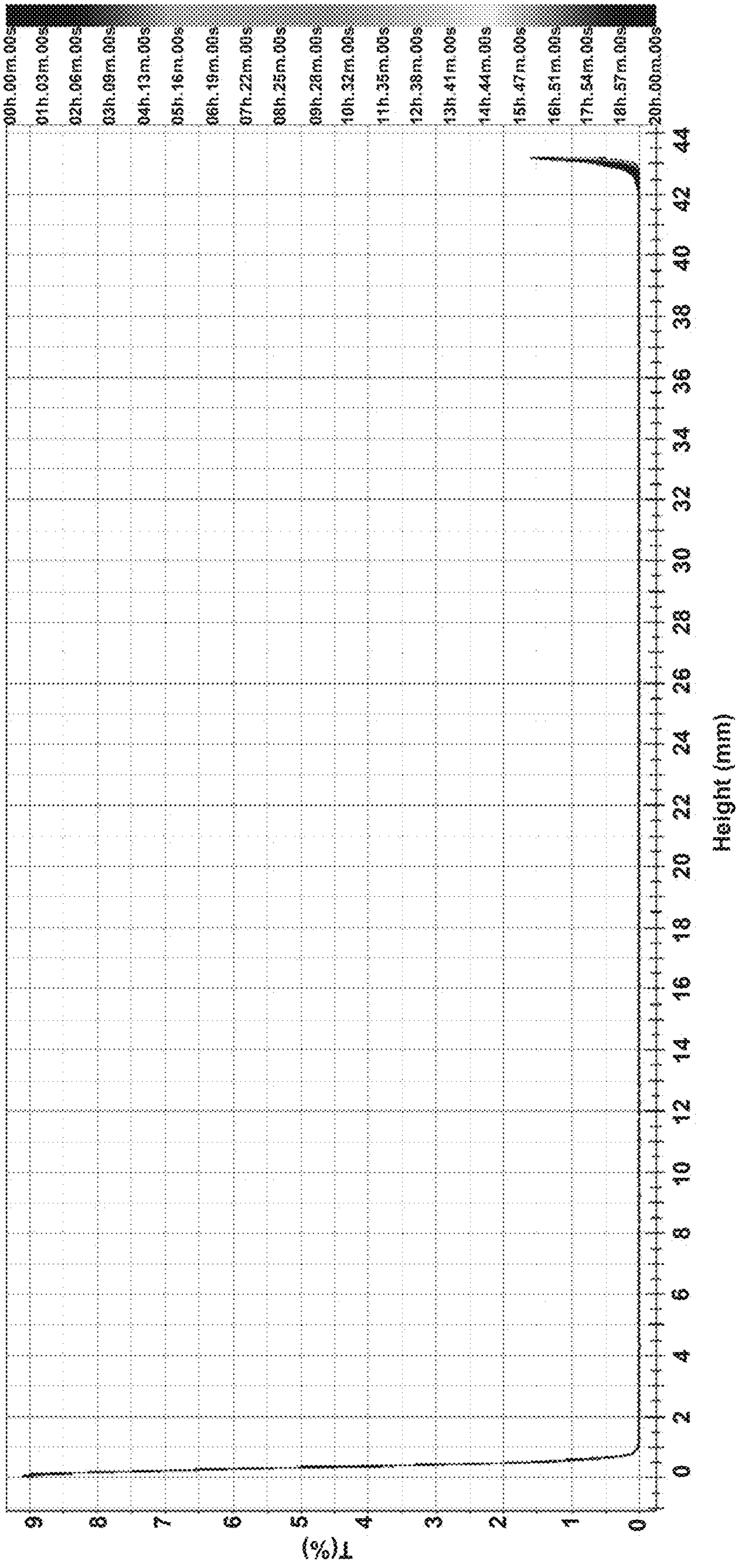
FIGS. 12A and 12B are graphs showing transmittance (T %) and backscatter light (BS %) characteristic curves, respectively, of fresh untreated lab-synthesized oil-in-water emulsion (base emulsion) with time.
Figure 12B:
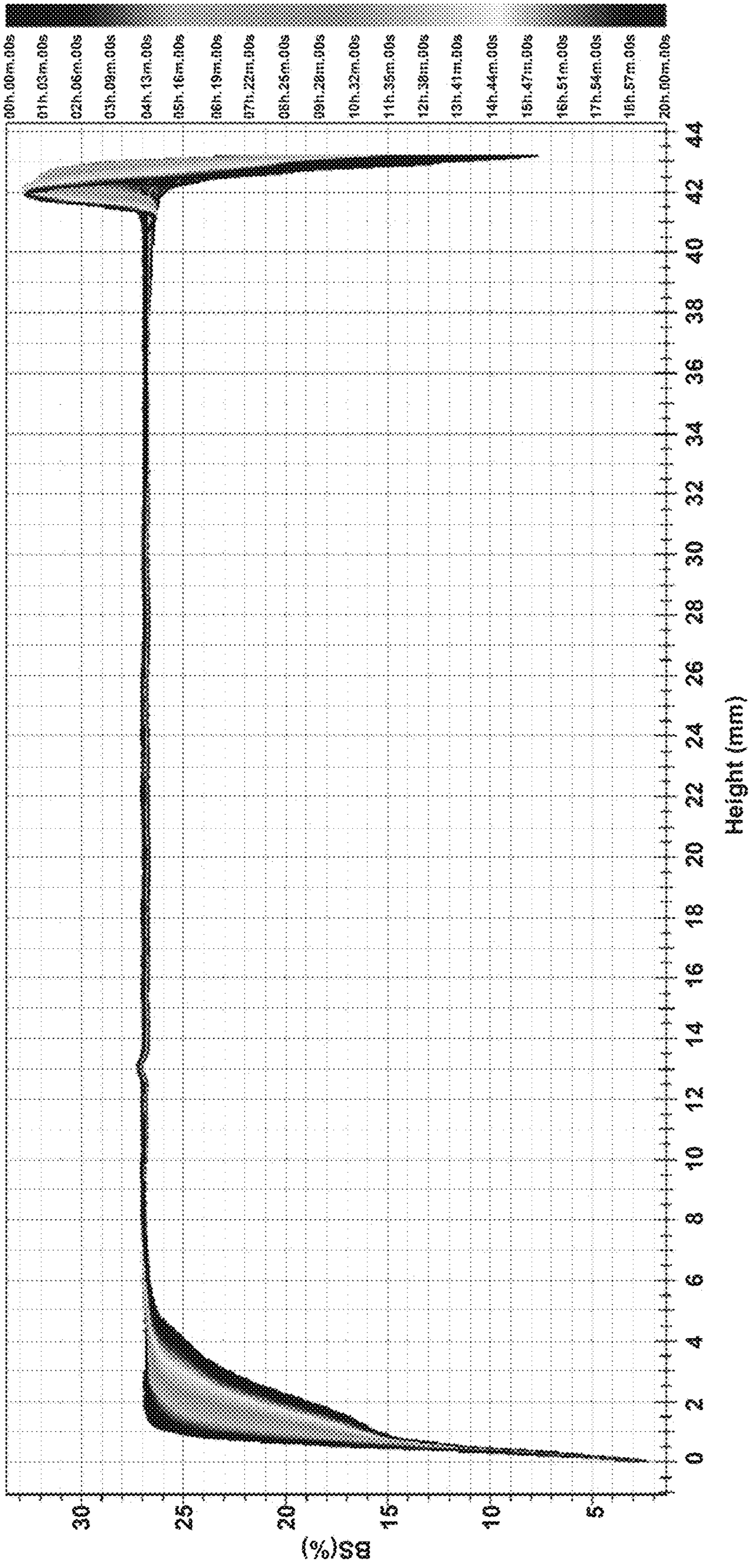

FIGS. 12A and 12B show light transmittance and backscatter profiles for the base emulsion with no additives over a period of 20 hours. The scan was carried out from top to bottom where a 42 cm position corresponded to the top liquid level and 0 cm to the bottom of the glass vial. Transmittance profiles show that light transmittance was almost 0 from the top to the bottom of the sample and remained that way for the entire duration of the experiment. This indicates the high stability of the synthesized oil-in-water emulsion. Backscatter data also showed that the emulsion changed little over a period of 20 hours.

Figure 13:
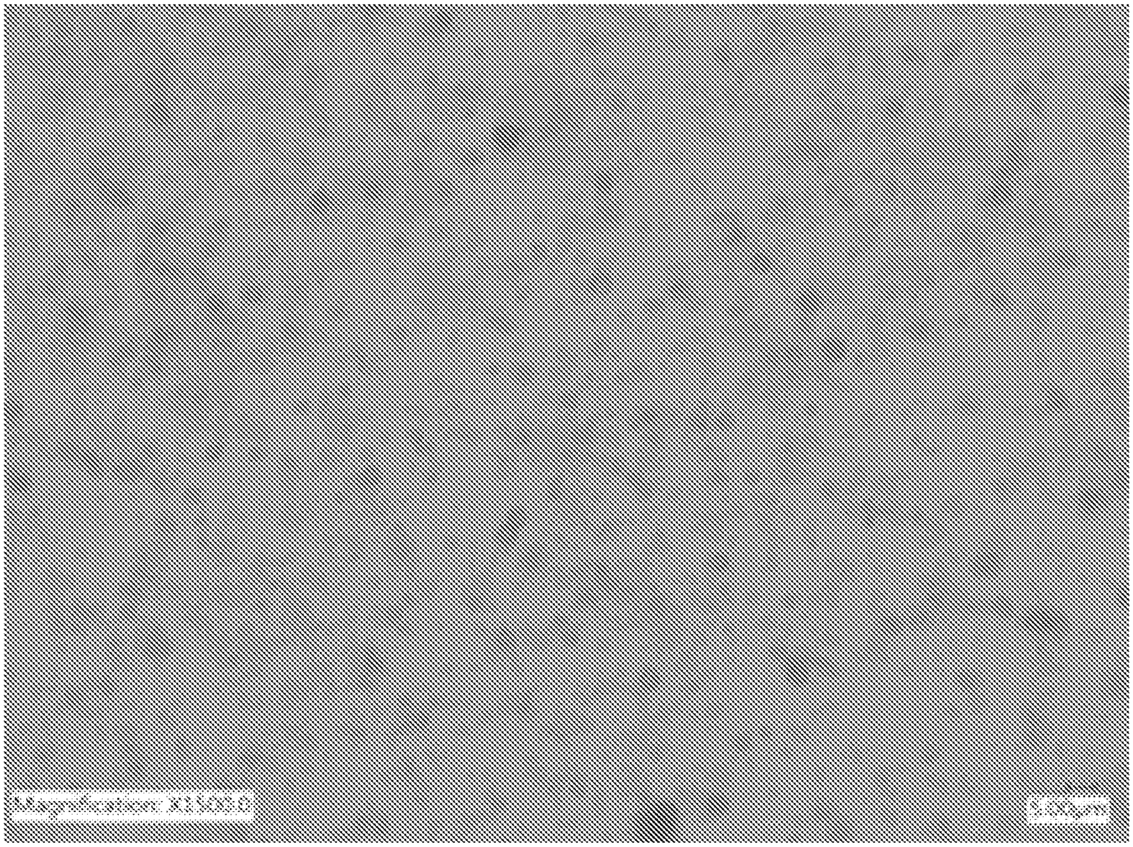
FIG. 13 is a micrograph showing drop sizes of untreated fresh lab-synthesized oil-in-water emulsion (base emulsion) under an optical microscope. The line in the bottom right corner of the picture represents the scale of 5.00 μm in drop size.

FIG. 13 is a micrograph of an oil-in-water emulsion sample viewed under a light microscope. The average drop size was ~5 μm which was consistent with the measurements from acoustic spectrometry (~10 μm).

FIGS. 14 to 16 show light transmittance (T %) and backscatter (BS %) data, as well as micrographs of the oil-rich and water-rich phases, for HexDA surfactant only, C6049 polymer only, and the HexDA+C6049 polymer formulation, respectively.

Figure 14A:
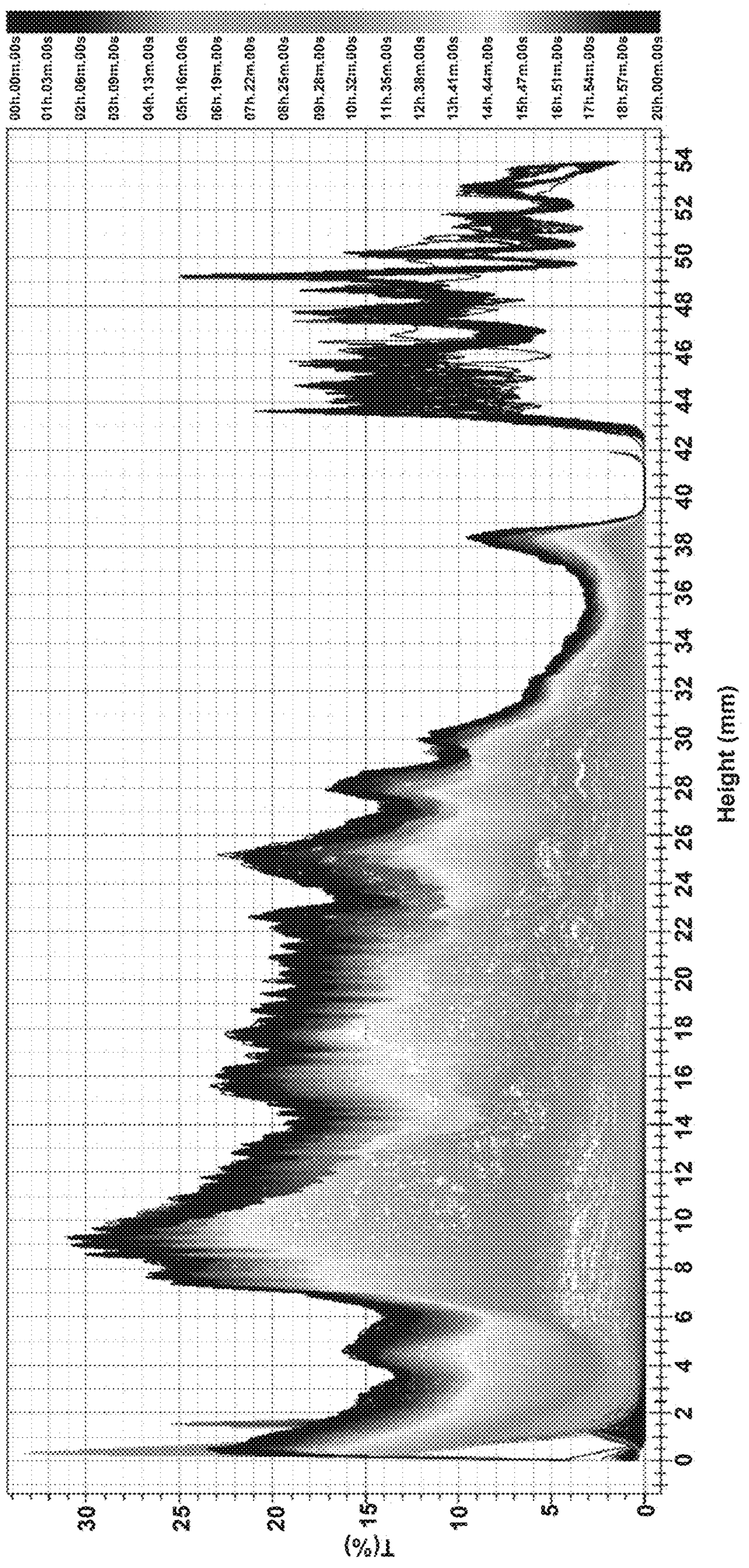
FIGS. 14A and 14B are graphs showing transmittance (T %) and backscatter light (BS %) characteristic curves, respectively, of fresh lab-synthesized oil-in-water emulsion treated with HexDA surfactant (8 ppm)
Figure 14B:
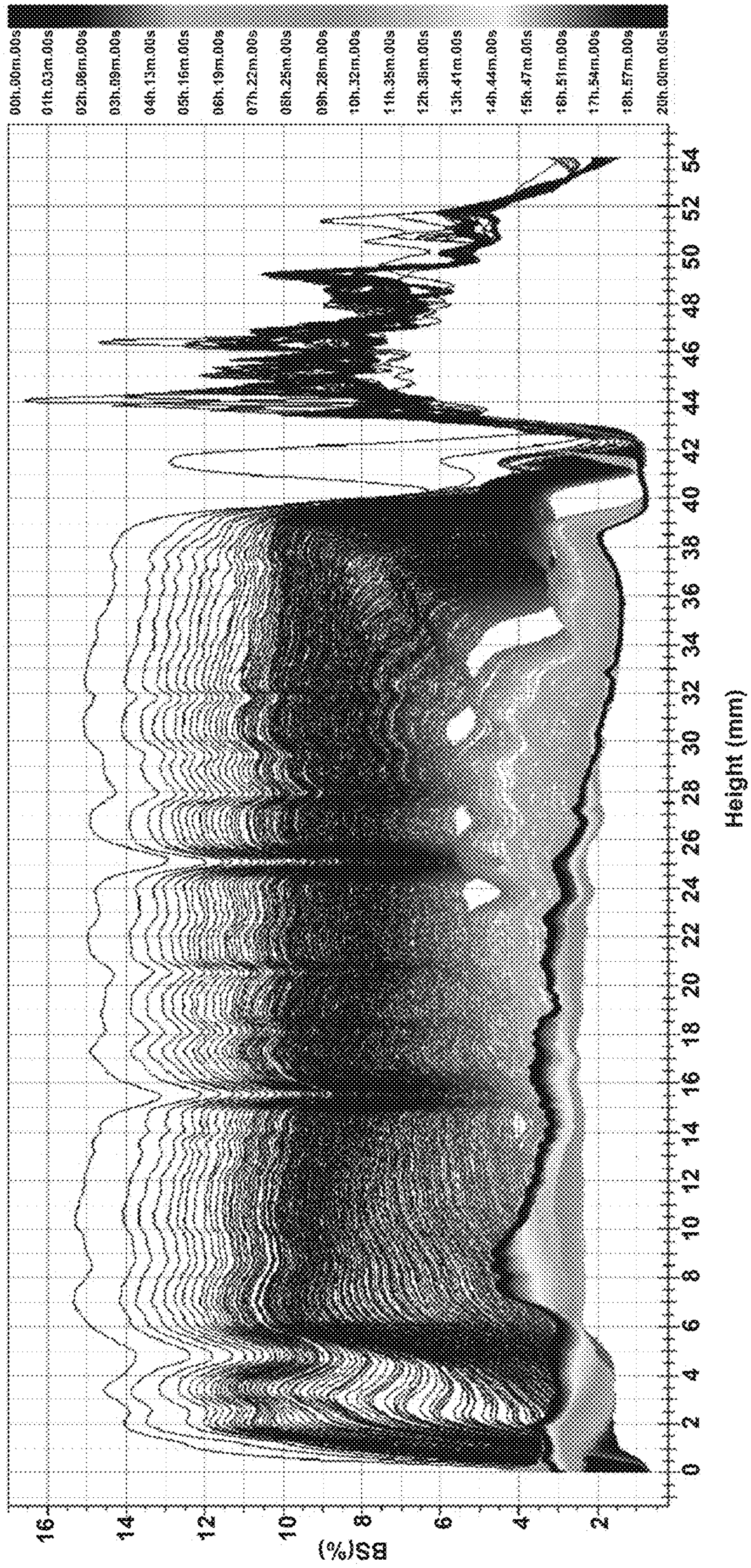
Figure 14C:
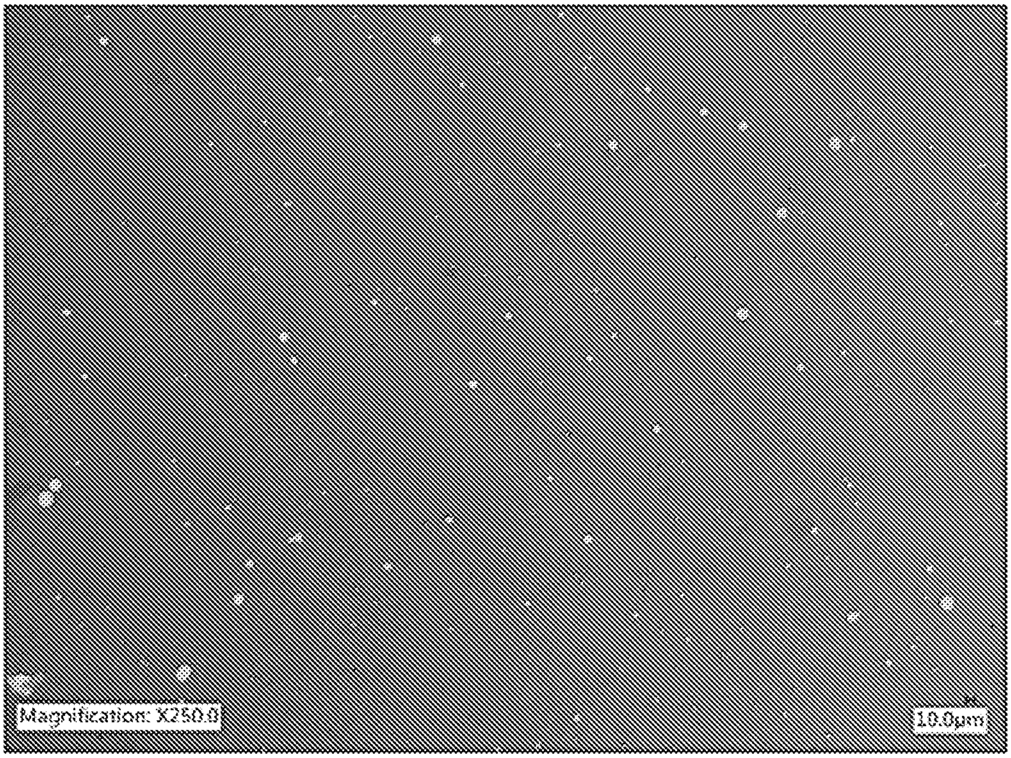
FIGS. 14C and 14D are optical micrographs of the top (oil-rich) phase and bottom (water-rich) phase, respectively, obtained after the treatment in FIGS. 14A and 14B. The line in the bottom right corner of the picture represents the scale of 5.00 μm in drop size.
Figure 14D:
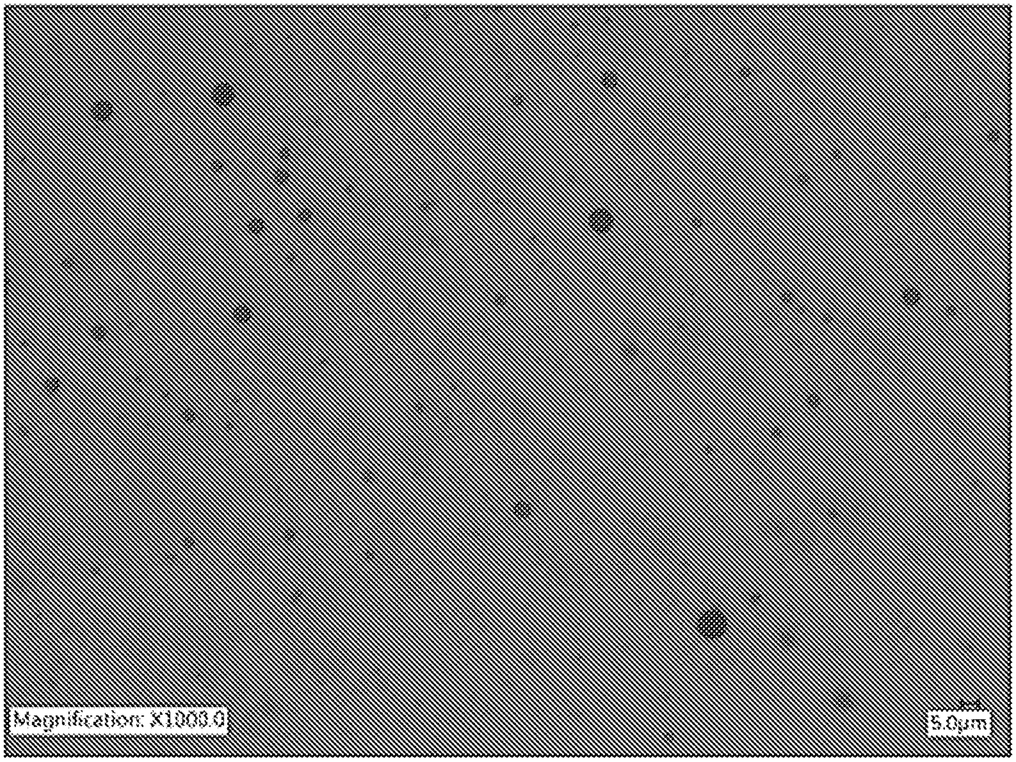

As shown in FIGS. 14A and 14B, for the HexDA surfactant only, there is a gradual increase in transmittance and a gradual reduction in backscatter light over the entire sample volume, over a 20-hour test period. This behavior was expected and closely follows the TSI trends with time reported in FIG. 9. The oil phase (FIG. 14C) looks continuous with some water drops dispersed in the oil matrix. The bottom phase (FIG. 14D) was water-rich with only few oil droplets.

Figure 15A:
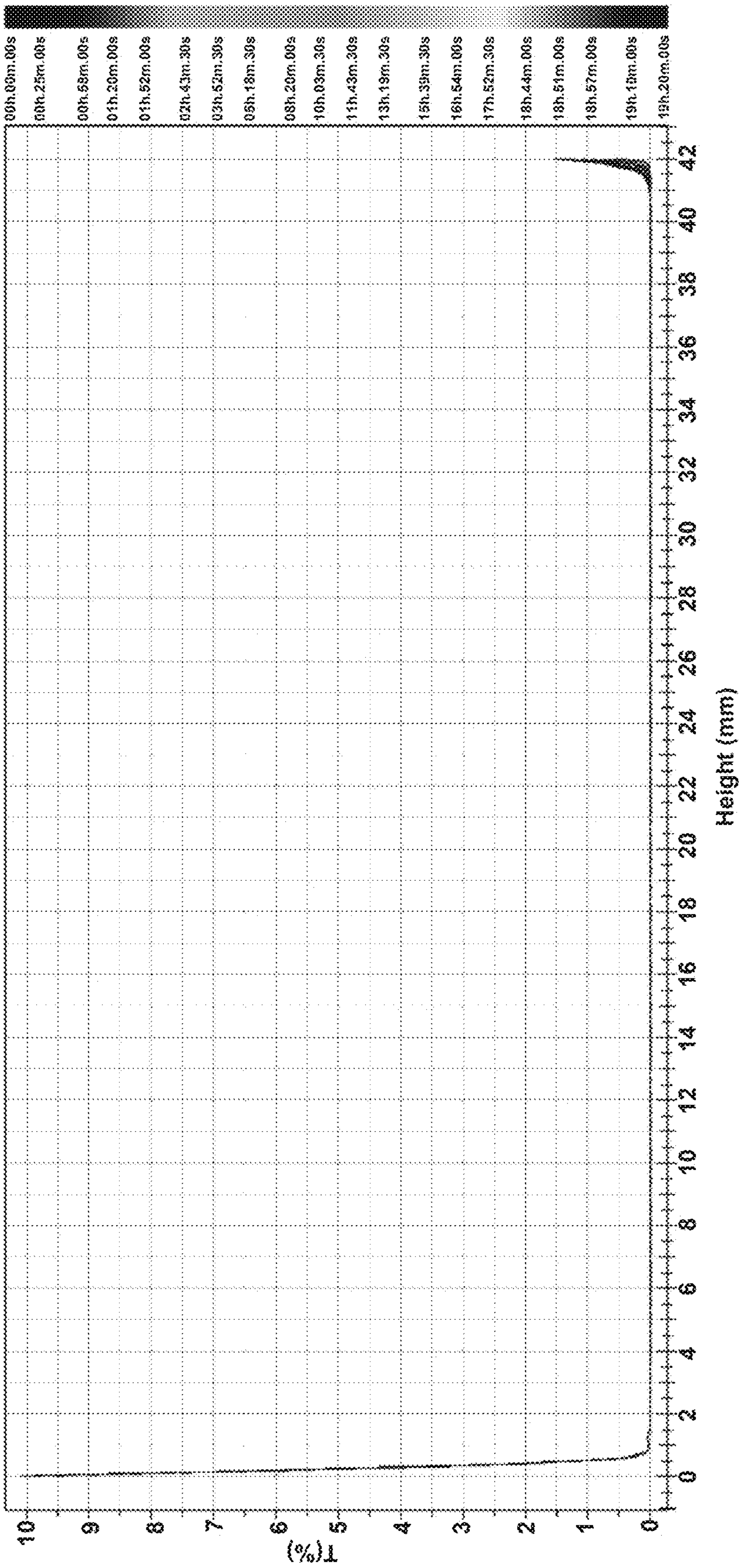
FIGS. 15A and 15B are graphs showing transmittance (T %) and backscatter light (BS %) characteristic curves, respectively, of fresh lab-synthesized oil-in-water emulsion treated with C6049 surfactant (11 ppm)
Figure 15B:
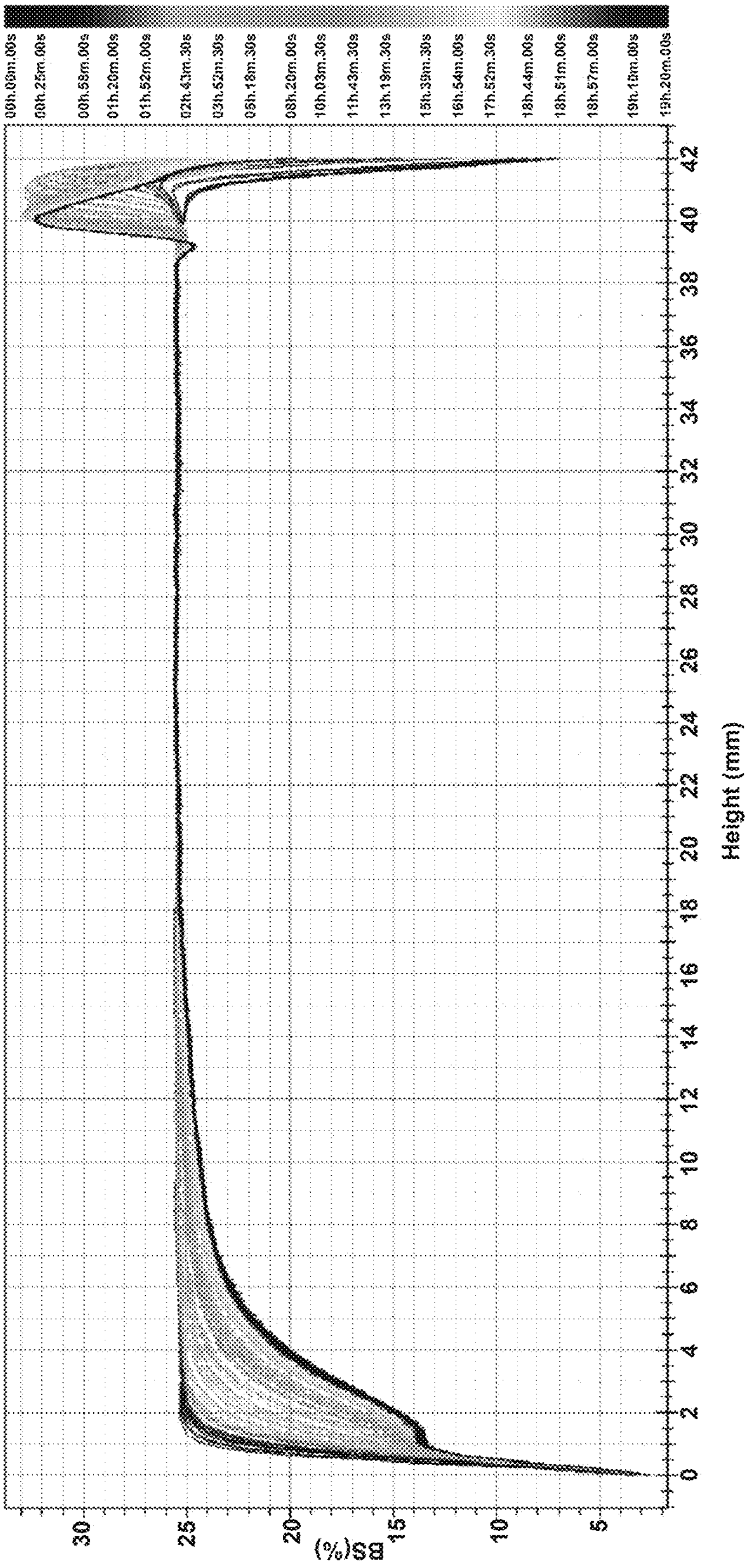
Figure 15C:
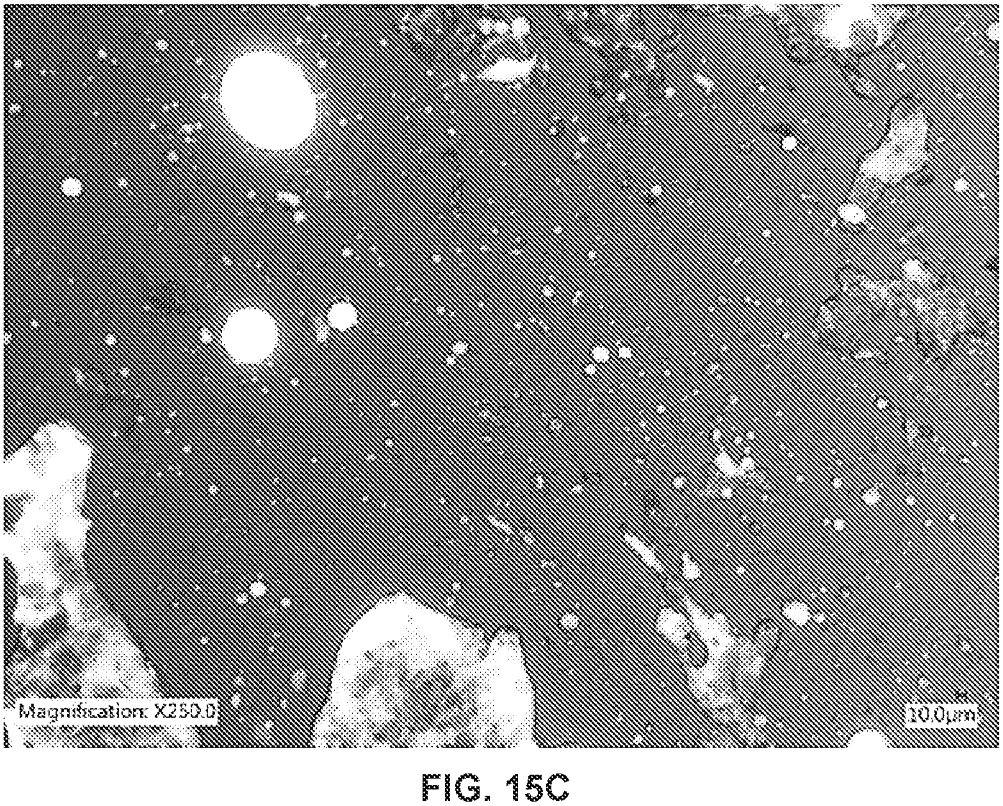
FIGS. 15C and 15D are optical micrographs of the top (oil-rich) phase and bottom (water-rich) phase, respectively, obtained after the treatment in FIGS. 15A and 15B. The line in the bottom right corner of the pictures represents the scale of 10.0 μm (FIG. 15C) and 5.00 μm (FIG. 15D) in drop size.
Figure 15D:
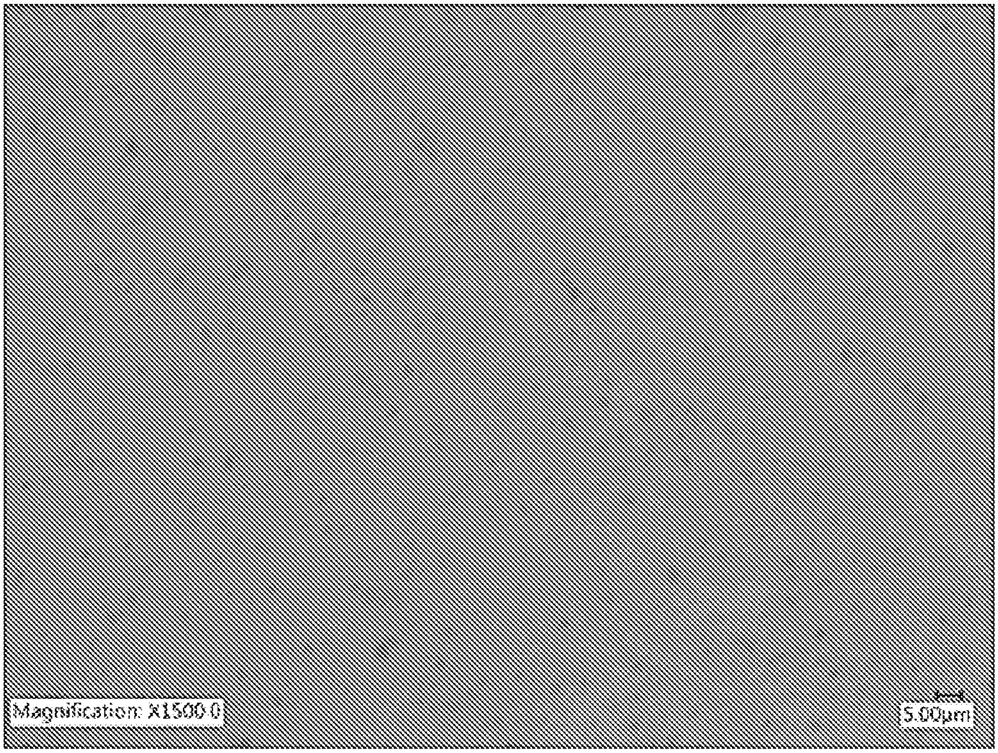

As shown in FIGS. 15A to 15D, phase separation in presence of polymer only was low and this could be due to limited mixing between the polymer and disperse oil-phase droplets. In this case, the oil phase appeared to be continuous (FIG. 15C) with water dispersed as large blobs in the oil matrix. FIG. 15D shows that the treated water phase had many small, dispersed oil drops (<5 μm) left after treatment.

Figure 16A:
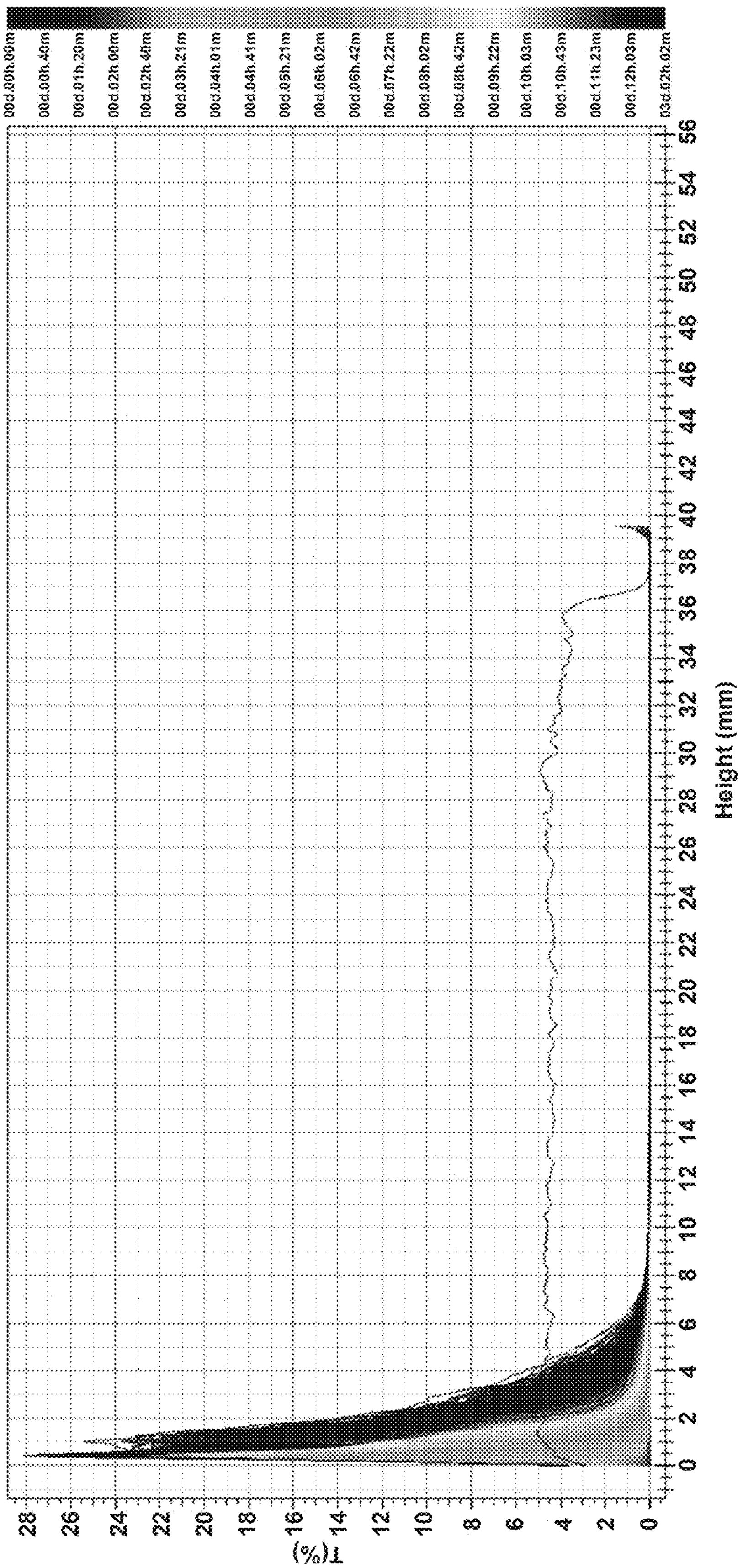
FIGS. 16A and 16B are graphs showing transmittance (T %) and backscatter light (BS %) characteristic curves, respectively, of fresh lab-synthesized oil-in-water emulsion treated with the HexDA+C6049 formulation (HexDA=8 ppm, C6049=11 ppm)
Figure 16B:
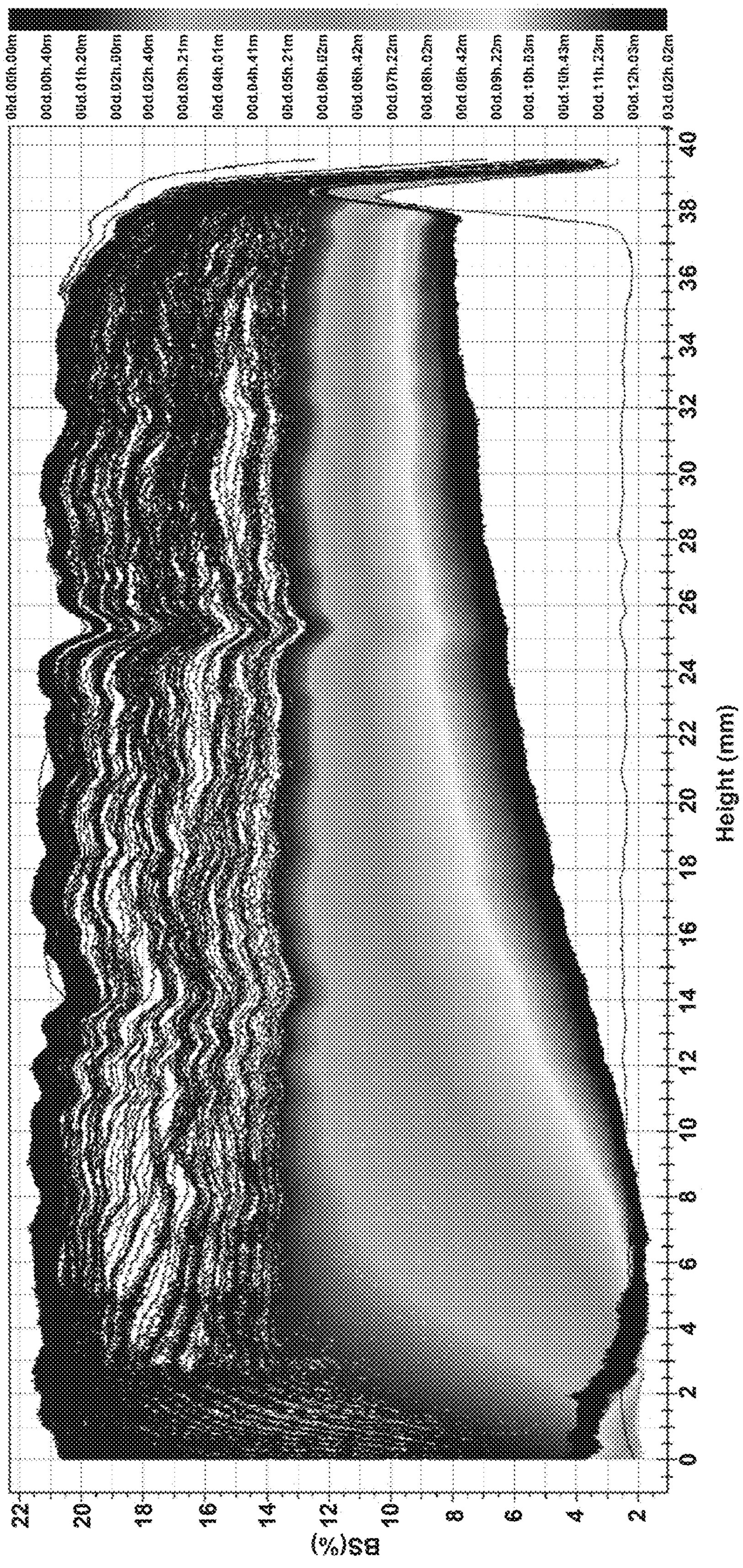
Figure 16C:
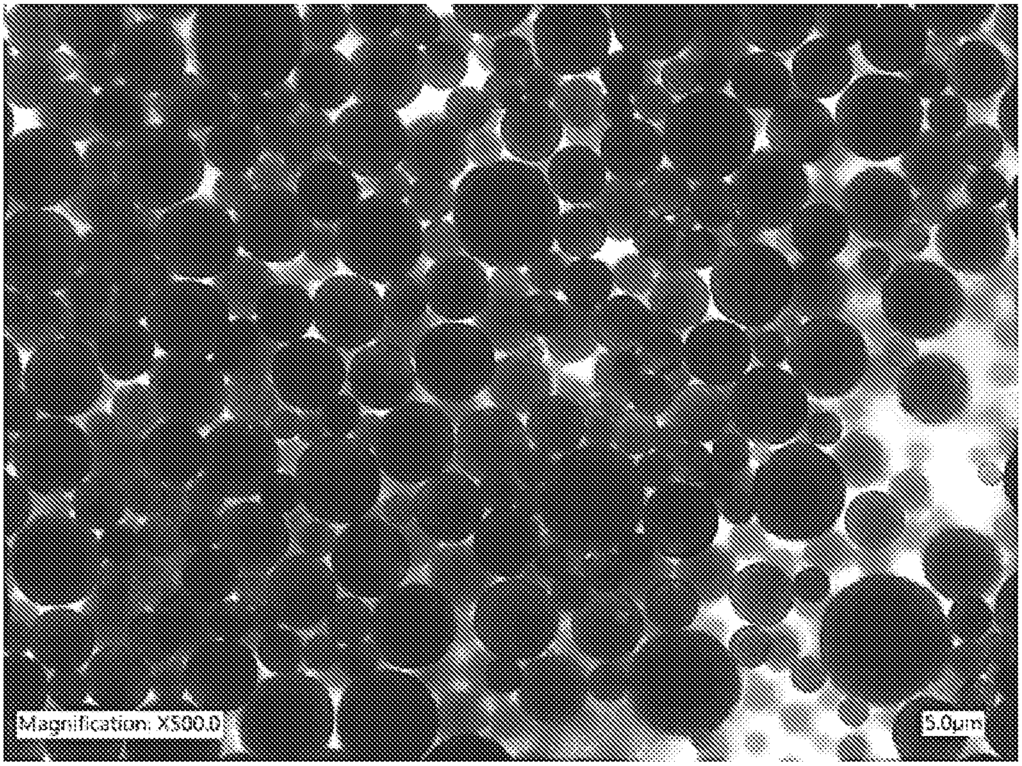
FIGS. 16C and 16D are optical micrographs of the top (oil-rich) phase and bottom (water-rich) phase with residual dispersed phase, respectively, obtained after the treatment in FIGS. 16A and 16B. The line in the bottom right corner of the picture represents the scale of 5.00 μm in drop size.
Figure 16D:
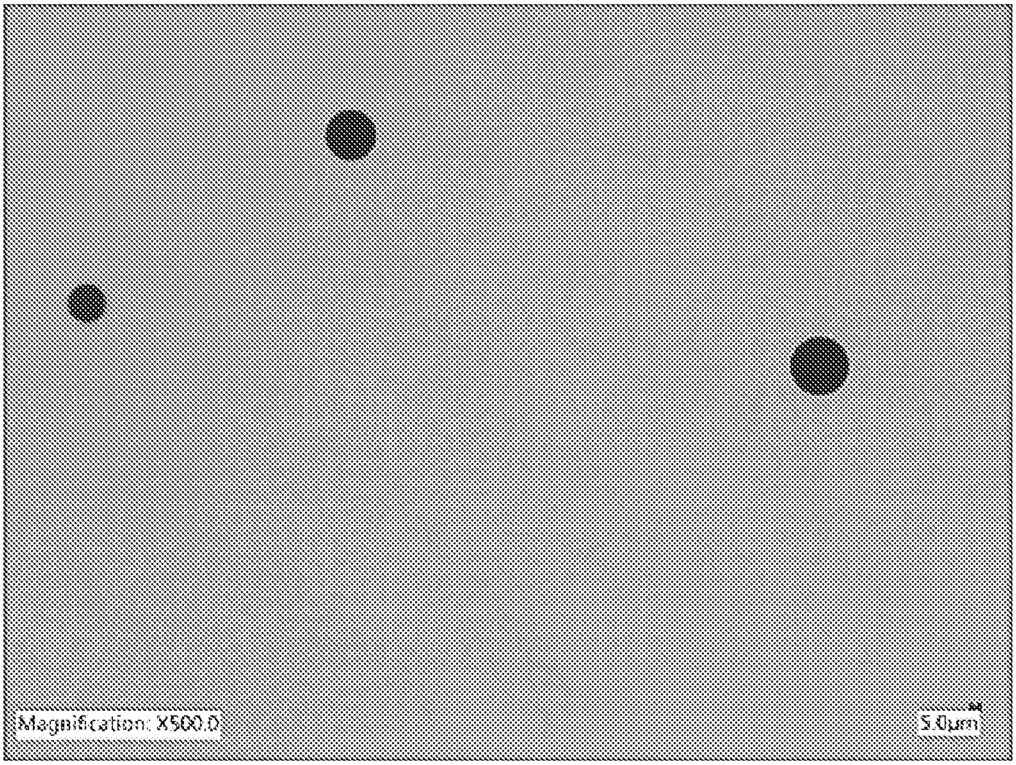

In contrast, as shown in FIGS. 16A to 16D, phase separation in the presence of HexDA+C6049 formulation was very significant, with the oil-rich phase creaming out of the system and existing as flocs. As shown in FIG. 16C, smaller oil droplets have coalesced and phase-separated as bigger droplets (20-50 μm) As shown in FIG. 16D, the water-rich phase appeared to have very little dispersed oil when observed under a microscope.

Example 1.8—Water and Oil Phase Characterization and Analysis

HexDA surfactant only, C6049 polymer only, and several HexDA+C6049 formulations were tested and their effects on various characteristics of the oil-in-water emulsion were quantified. Post-treatment, the water-rich phase was decanted and analyzed in several ways to characterize it in terms of the total oil content, mean drop size, zeta potential, turbidity, total acid number, and naphthenic acid content. The results are summarized in Table 2 below. Unseparated drops <190 nm were highly stable, practically inseparable, and therefore considered to be part of "dissolved oil" in water.

TABLE 2

Measured characteristics of treated oil-in-water emulsion (at RT, ~23° C.)

| Type | Dose (ppm) | Total Oil Content(ppm) | Drop Mean Size (micron) | Zeta Pot. (mV) | Turbidity (NTU) | TAN (mg KOH/g) | NA (μg/L) |
|---|---|---|---|---|---|---|---|
| De-ionized Water (Control) | — | — | — | — | 0.3 ± 0.03 | — | — |
| E (Base emulsion, control) | — | 7736-8800 (SE) 5460-5518 (TOC) 2.5 wt % (<C9) | 10 ± 2 | −38 ± 14 | >10,000 | 0.14 | 5410 |
| E + S | S = 8 | 190 (SE) | 2.2 ± 0.4 | −10 ± 0.2 | 189 ± 0.5 | | |
| E + P | P = 11 | 2460 (SE) | 0.3 ± 0.06 | 10 ± 0.05 | >10,000 | | |
| E + (S + P) | S = 8 P = 11 | 2.7-6 (SE) nm (<C9) | 0.88 ± 0.05 | −5 ± 0.4 | 18 ± 0.3 | nm | 382 |
| E + (S + P) | S = 24 P = 33 | 1084 (SE) | 1.03 ± 0.1 | 2.5 ± 0.1 | | | |
| E + Cent. | — | 287 (SE) 0.19 wt % (<C9) | 0.19 ± 0.004 | 0.96 ± 0.1 | | <0.1 | 323 |

E = synthetic emulsion;
S = HexDA surfactant;
P = C6049 polymer;
Cent. = Centrifugation at 40,000 rpm, 24 hrs;
nm = not measurable due to low oil content in the water matrix;
TAN = total acid number;
NA = 131 types of carboxylic/naphthenic acid species were analyzed,
RT = Room Temperature.

Data from Table 2 indicates that both surfactant and polymer were able to destabilize the oil-in-water emulsion. The surfactant-only treatment worked relatively well and reduced total oil content to 190 ppm; however, the reduction in oil content was limited with polymer-only treatment (i.e. oil content remained at 2460 ppm level). At the same time, the additives were able to reduce the oil drop size from 10 μm to about 2.2 μm and 300 nm, respectively.

The cationic formulation at IEP dosages (HexDA=8 ppm and C6049=11 ppm) performed significantly better than either single treatment. Total oil content was reduced to 6 ppm and mean drop size was reduced to less than 1 μm. The zeta potential and turbidity were also low. Naphthenic acid decreased to 382 μg/L range and total acid number reached trace levels. The turbidity of the water phase dropped to 18 NTU from >10,000 NTU in the synthetic oil-in-water emulsion.

However, the cationic formulation at 3×IEP dosages (i.e. HexDA=24 ppm and C6049=33 ppm) failed to improve the additive performance, resulting in higher oil content, larger mean drop size, and turbidity as compared to the formulation at IEP dosages. This could be due to electrostatic stabilization of the oil droplets with a net positive charge (positive zeta potential) in the presence of excess cationic surfactant and polymer.

A portion of the synthetic oil-in-water emulsion was subjected to ultra-centrifugation at 40,000 rpm for a period of 24 hours. The g-force was sufficient to separate oil droplets as small as 50 nm and typically the leftover oil in water phase was considered to be 'dissolved' or 'almost-dissolved' in water. Post-centrifugation, the separated water phase was carefully collected and tested for total oil content which was found to be 287 ppm with a naphthenic acid content of 323 μg/L (0.323 ppm). Total Oil Content (TOC) content after the surfactant+polymer chemical treatment (6 ppm) was lower than the 'dissolved' oil from the centrifugation tests (287 ppm), indicating that the chemical treatment was able to remove essentially all (or almost all) of the dispersed oil droplets, reaching to dissolved oil levels. Total oil content in centrifuged water when compared to chemically treated water showed that the chemical treatment was also able to remove at least a portion of the dissolved oil as well.

Figure 17:
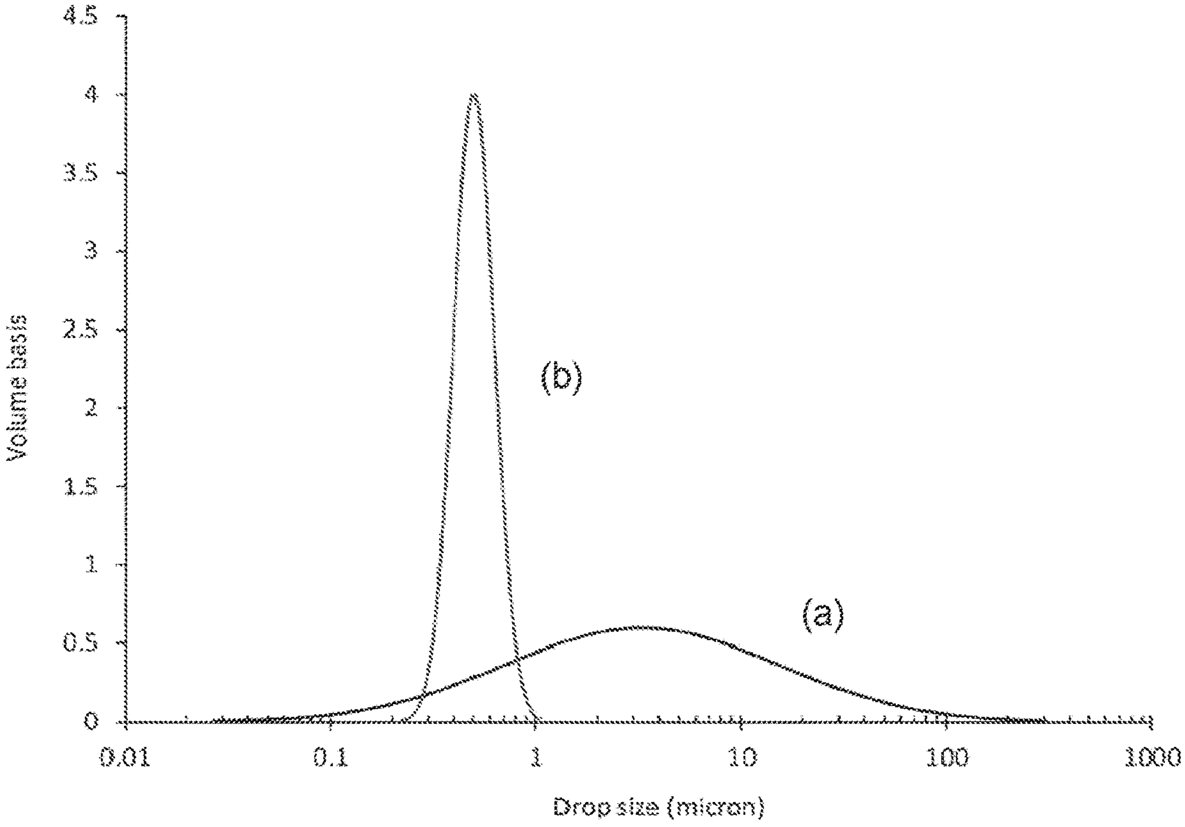
FIG. 17 is a graph showing particle size distribution (PSD) of oil droplets in the water phase of the fresh lab-synthesized oil-in-water emulsion before (a) and after (b) treatment with HexDA+C6049 formulation.

FIG. 17 shows the PSD of oil droplets in the water-rich phase from the synthetic o/w emulsion collected from an acoustic spectrometer before (a) and after (b) treatment with the HexDA+C6049 polymer formulation. PSD was found to shift from right to the left (i.e. smaller drop size) on chemical treatment.

Example 1.9—Conclusions from Synthetic Oil-in-Water Emulsion Experiments

A total of two cationic surfactants (HexDA and BtyTA) and four cationic polymers (C2019, C4039, C6049, and C8049) were investigated for their demulsification tendencies. The phase separation could be the end result of droplets flocculating together and creaming out under normal-g field, and/or droplets coalescing together to form larger droplets which continued to grow until the oil phase completely withdrew from the water continuous phase. Cationic polymers appeared to promote the former mechanism (floc formation) while the surfactants appeared to promote drop coalescence. Cationic formulations (surfactant-polymer combinations) seemed to settle somewhere in between the two mechanisms and were found to be most effective in removing the oil phase from water-continuous emulsions. This was confirmed by the stability tests and the micrographs.

IEP determination tests showed that cationic HexDA and cationic C6049 required the lowest dosages (8 ppm and 11 ppm) to alter the effective emulsion zeta potential from about −34 mV to ≈0 mV and were therefore chosen for further testing. Furthermore, a cationic formulation based on the IEP dosages of the HexDA surfactant and C6049 polymer performed well in destabilizing the oil-in-water emulsion with extreme reduction of total oil content, oil drop mean size, and turbidity. The cationic formulation was able to reduce the oil content in water from around 8000 ppm to 6 ppm. The 6 ppm level indicates that essentially all (or almost all) of the dispersed oil and most of the dissolved oil was extracted. Significantly higher dosages of the formulation (3×IEP dosages) favored emulsion destabilization, but the oil-water separation efficiency was lower than the IEP dosage formulation. The 3×IEP dosage formulation appeared to stabilize the oil drops to some extent, preventing further drop coalescence and phase separation.

Example 2—SAGD Process Water Sample Experiments

Example 2.1—SAGD Process Water Characteristics

A SAGD process water sample was analyzed using the procedures discussed above for Example 1. Compared to the synthetic emulsion of Example 1, the total oil content of the SAGD water was very low (805 ppm), which was likely due to the water sample being a year old, during which time oil may have been lost during transportation, during creaming, chemical oxidation, etc. The physical characteristics of the SAGD process water sample are summarized in Table 3:

TABLE 3

SAGD process water characteristics before chemical treatment (at RT, ~23° C.)

| SAGD | Specifications | | |
|---|---|---|---|
| Process Water (as obtained) | Mean drop size (μm) | Zeta potential (mV) | Total oil(ppm) |
| | 2.6 ± 0.36 | −29.7 | 805 (TOC) |

RT = Room Temperature.

Example 2.2—Treatment of SAGD Process Water with Additives

The SAGD process water was treated with the HexDA+C6049 formulation at very high dosages ($10^4$ HexDA ppm and $10^3$ ppm C6049). As shown in Table 4 below, the oil content of SAGD process water merely dropped to 515 ppm which was just a little lower than oil content prior to treatment (i.e. 850 ppm). The SAGD sample appeared to have a lot of dissolved oil (dark yellow color) and some visibly dispersed oil. The chemical treatment evidently removed essentially all dispersed oil content, but little dissolved oil, as indicated by the remaining deep-yellow color. This could be due to dissolution of various classes of organic species in the water phase at high temperature processing (200° C.) conditions (i.e. SAGD processing conditions). SAGD processing conditions are much more severe than synthetic emulsion preparation conditions in lab. Furthermore, post-treatment of SAGD process water, the zeta potential was observed to be very high and was an indication of high chemical dose levels (large cationic level) in the water phase.

TABLE 4

SAGD process water characteristics after chemical treatment (at RT, ~23° C.)

| Treatment Scheme (23° C.) Dosage (ppm) | | Water-phase Characteristics (After Treatment) | | | | | | |
|---|---|---|---|---|---|---|---|---|
| | | Total Oil SolEx, TOC (ppm) | Mean Size (μm) | Zeta Pot. (mV) | Turbidity (NTU) | TAN (mg KOH/g) | NA (μg/L) |
| SAGD Process Water | very high ($S = 10^4$, $P = 10^3$) | 121 (SE) 503-515 (TOC) | 2.6 ± 0.36 | 6410 | — | — | — |

RT = Room Temperature.

Figure 18A:
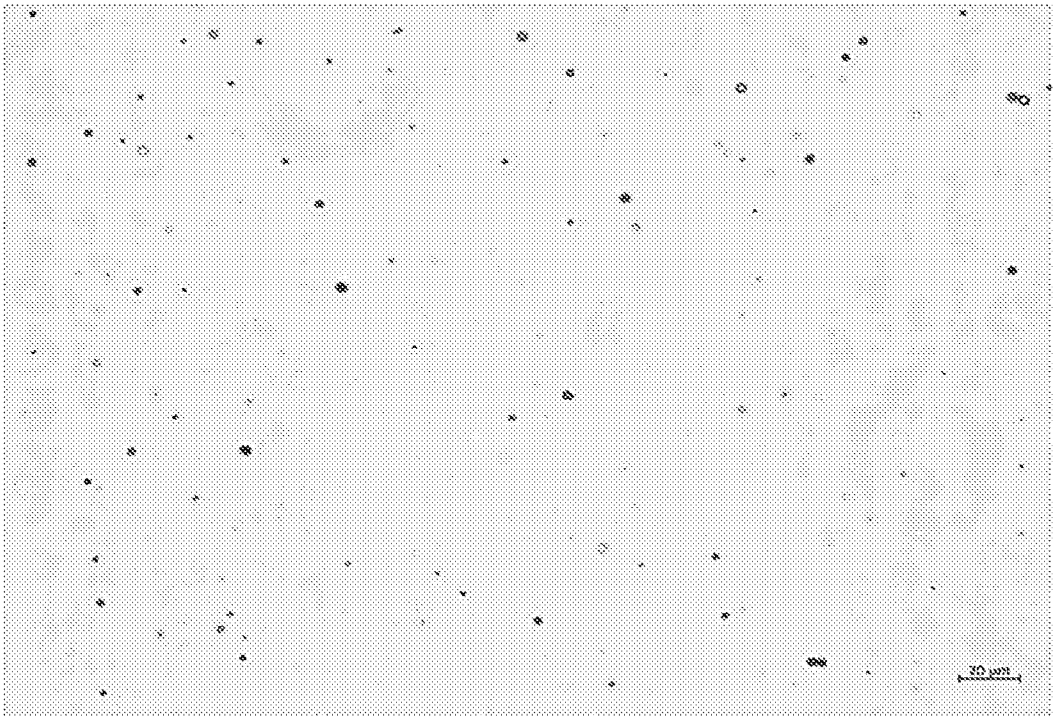
FIGS. 18A and 18B are micrographs showing a SAGD process water sample before and after treatment with HexDA+C6049 formulation, respectively.
Figure 18B:

FIGS. 18A and 18B are micrographs showing the SAGD process water sample before and after HexDA+C6049 polymer treatment, respectively. Before treatment there were a significant number of 5 μm and smaller droplets. However, following chemical treatment, the water phase appeared completely free of any oil droplets as evident in FIG. 18B.

Example 3—SAGD Produced Water and Emulsion Sample Experiments

Example 3.1—SAGD Produced Water and Emulsion Characteristics

Figure 19A:
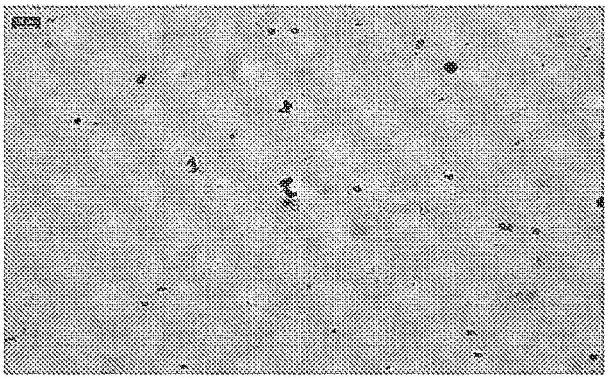
FIGS. 19A and 19B are micrographs showing SAGD Produced Water and Emulsion samples, respectively.
Figure 19B:
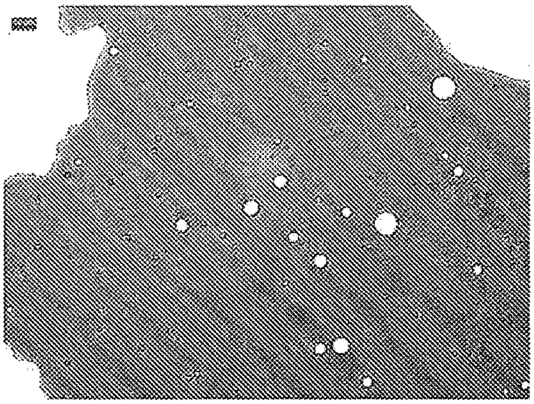

Two sets of water samples, both oil-in-water emulsions, from SAGD facilities were studied: a) a water sample from the outlet of the slug catcher (first stage of water separation from the emulsion as it enters the plant), hereafter referred to as the "SAGD Produced Water" sample; and b) a water sample from the emulsion inlet from the production pads to the oil treating plant, hereafter referred to as the "Emulsion" sample. Micrographs of the SAGD Produced Water and Emulsion samples are shown in FIGS. 19A and 19B, respectively.

Both samples were characterized in terms of the total oil dispersed and the drop size distribution (PSD). The oil content was determined by a solvent-based extraction method (tetrachloroethylene solvent). Typical detection limit was 0.5 μg/mL (0.5 ppm) using FTIR and the drop size distribution by microscopy. The oil content of the SAGD Produced Water sample was 510 ppm of total oil, while the oil content of the Emulsion sample was 5700 ppm.

Figure 19C:
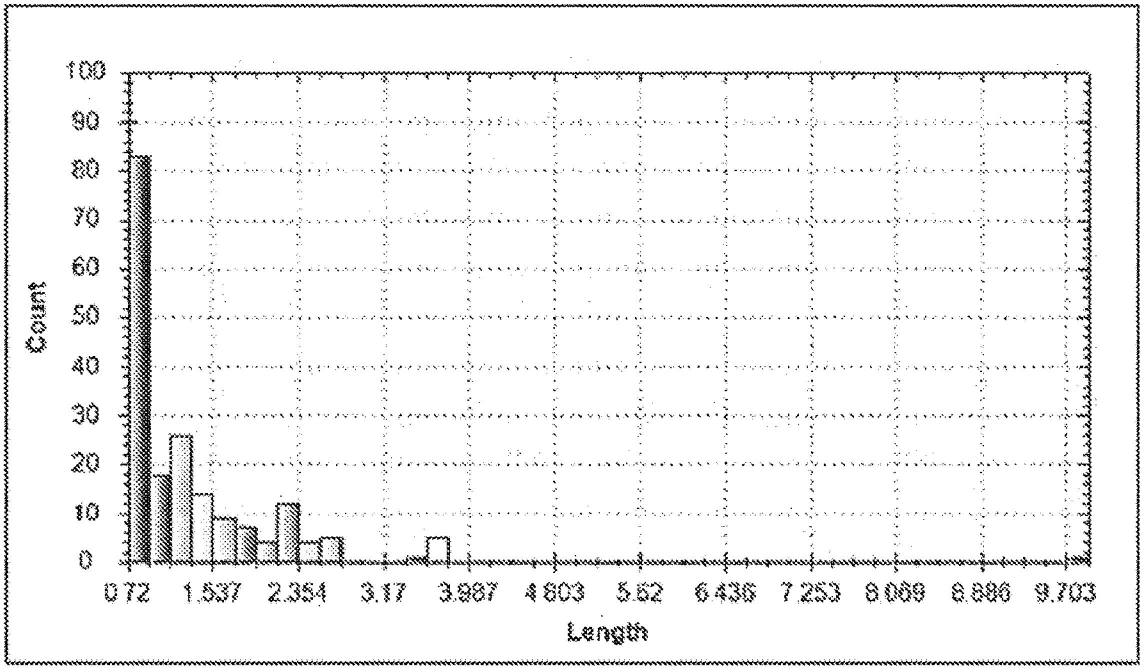
FIG. 19C is a graph showing particle size distribution and mean particle size of the SAGD Produced Water sample of FIG. 19A.

FIG. 19C shows the particle size distribution of the SAGD Produced Water. The results are also summarized in Table 5 below:

TABLE 5

| Particle size distribution of SAGD Produced Water (at RT, ~23° C.) | |
|---|---|
| Mean (μm) | 1.354 |
| Minimum (μm) | 0.720 |
| Maximum (μm) | 9.907 |
| Std Dev (μm) | 0.926 |

The SAGD Produced Water was found to have a mean drop size of just 1.354 microns, small enough to produce very stable systems. In the case of the Emulsion, the drop size was not determined due to heterogeneity and the presence of free oil in the system.

Example 3.2—Treatment of SAGD Produced Water and Emulsion with Additives

Fluid samples were treated with HexDA (92 ppm) prepared as 0.01 M solution, C6049 polymer (53 ppm) prepared as a $1.1\times10^{-7}$ M solution, and a HexDA+C6049 formulation (92 ppm; 53 ppm). Since SAGD Produced Water stream is relatively hot (80-90° C.) at field conditions, the treatments were performed at 80° C. to simulate these conditions.

Figure 20A:
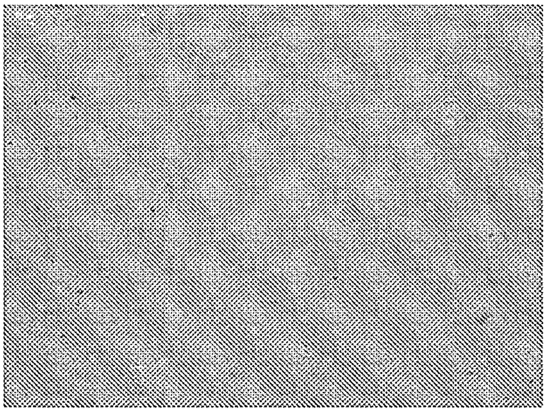
FIGS. 20A and 20B are micrographs of the top fluid and bottom fluid (respectively) of SAGD Produced Water treated with HexDA (92 ppm) at 80° C.
Figure 20B:
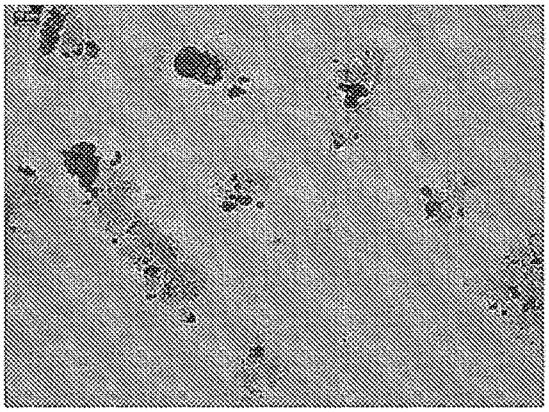
Figure 20C:
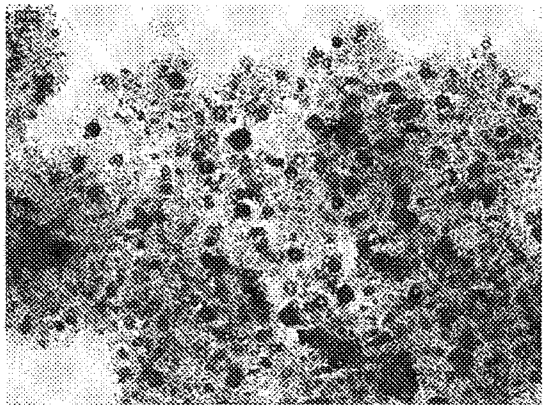
FIGS. 20C and 20D are micrographs of the top fluid and bottom fluid (respectively) of SAGD Produced Water treated with C6049 (53 ppm) at 80° C.
Figure 20D:
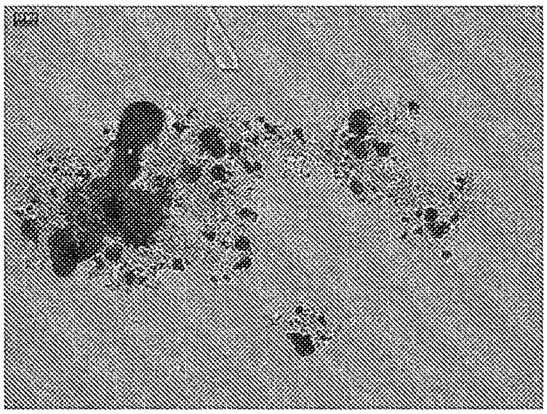
Figure 20E:
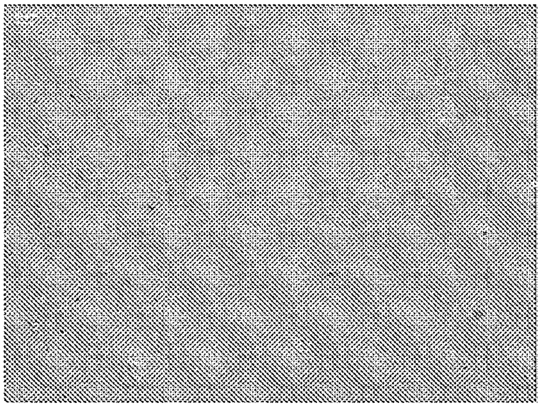
FIG. 20E is a micrograph of the top fluid of SAGD Produced Water treated with HexDA+C6049 formulation (92 ppm; 53 ppm) at 80° C.
Figure 20F:
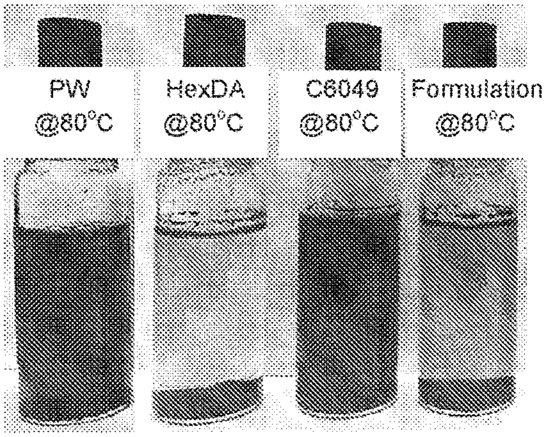
FIG. 20F is a photograph showing (from left to right): SAGD Produced Water with no treatment ("PW"), HexDA (92 ppm), C6049 (53 ppm), and HexDA+C6049 formulation (92 ppm; 53 ppm; "Formulation") treatments at 80° C.

The results for the SAGD Produced Water (PW) sample (510 ppm total oil) are shown in FIGS. 20A-20F for a separation time of 30 minutes. When the SAGD Produced Water was treated with HexDA only or C6049 only, the oil content was reduced to 8 ppm (FIG. 20A) and 34 ppm (FIG. 20C), respectively. When the SAGD Produced Water was treated with the HexDA+C6049 formulation, the oil content was reduced to just 1 ppm (FIG. 20E).

Figure 21A:
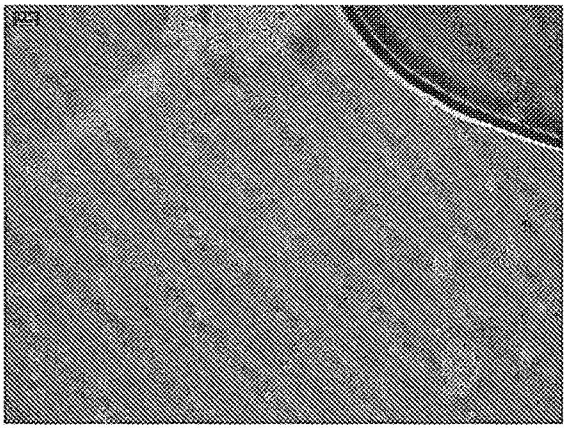
FIGS. 21A and 21B are micrographs of the top fluid and bottom fluid (respectively) of SAGD Emulsion treated with HexDA (92 ppm) at 80° C.
Figure 21B:
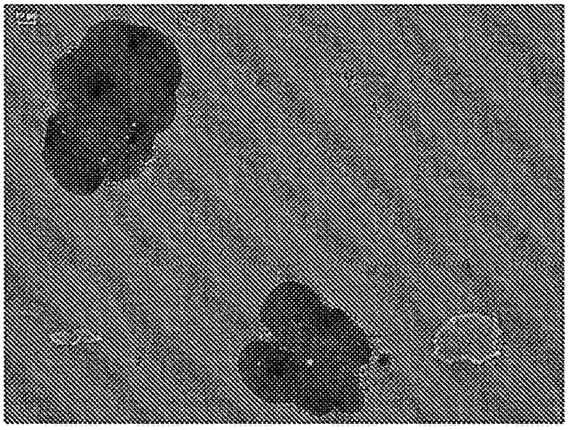
Figure 21C:
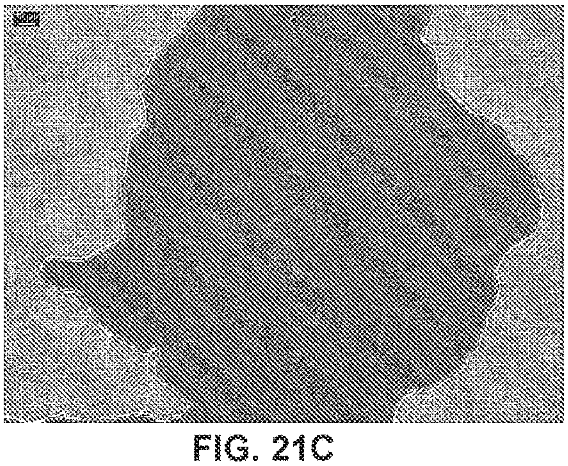
FIGS. 21C and 21D are micrographs of the top fluid and bottom fluid (respectively) of SAGD Emulsion treated with C6049 (53 ppm) at 80° C.
Figure 21D:
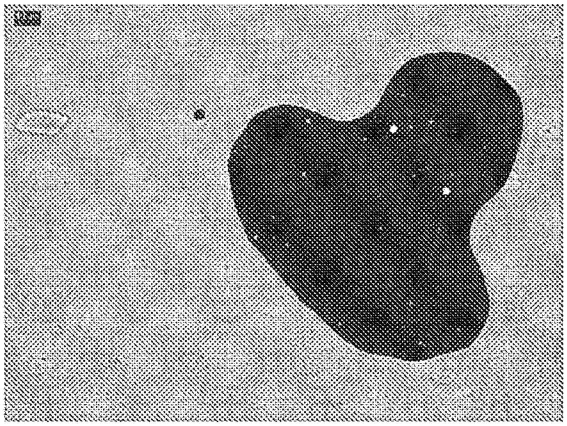
Figure 21E:
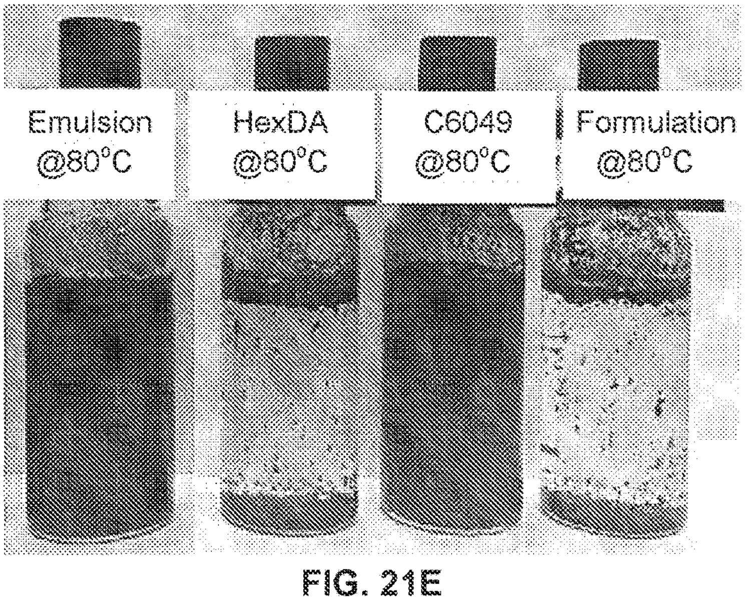
FIG. 21E is a photograph showing (from left to right): SAGD Emulsion with no treatment ("Emulsion") HexDA (92 ppm), C6049 (53 ppm), and HexDA+C6049 formulation (92 ppm; 53 ppm; "Formulation") at 80° C. treatments.

The results for the Emulsion sample (5700 ppm total oil) are shown in FIGS. 21A-21E for a separation time of 30 minutes. When the Emulsion was treated with HexDA only or C6049 only, the oil content was reduced to 120 ppm (FIG. 21A) and 180 ppm (FIG. 21C), respectively. When the Emulsion was treated with the HexDA+C6049 formulation, the oil content was reduced to just 26 ppm (FIG. 21E).

Figure 22:
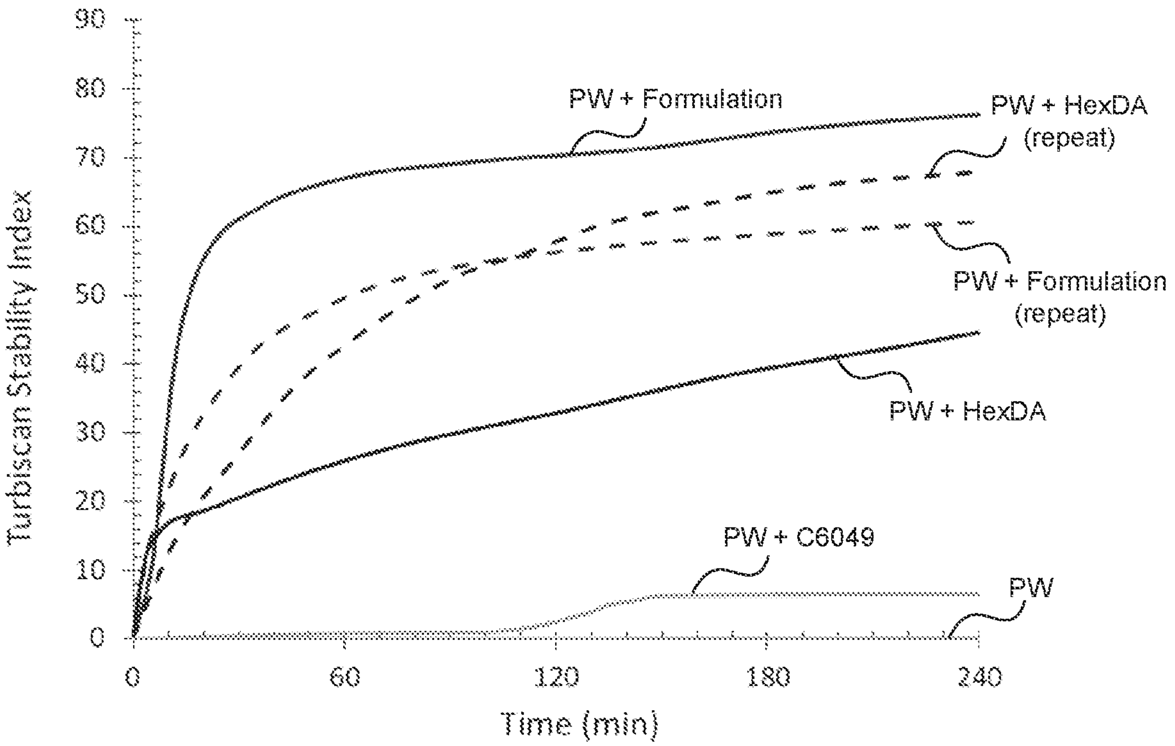
FIG. 22 is a graph of the Turbiscan stability index over time at 80° C. for SAGD Produced Water treated with no treatment ("PW"), HexDA (92 ppm), C6049 (53 ppm), and HexDA+C6049 formulation (92 ppm; 53 ppm; "Formulation") with limited mixing.
Figure 23:
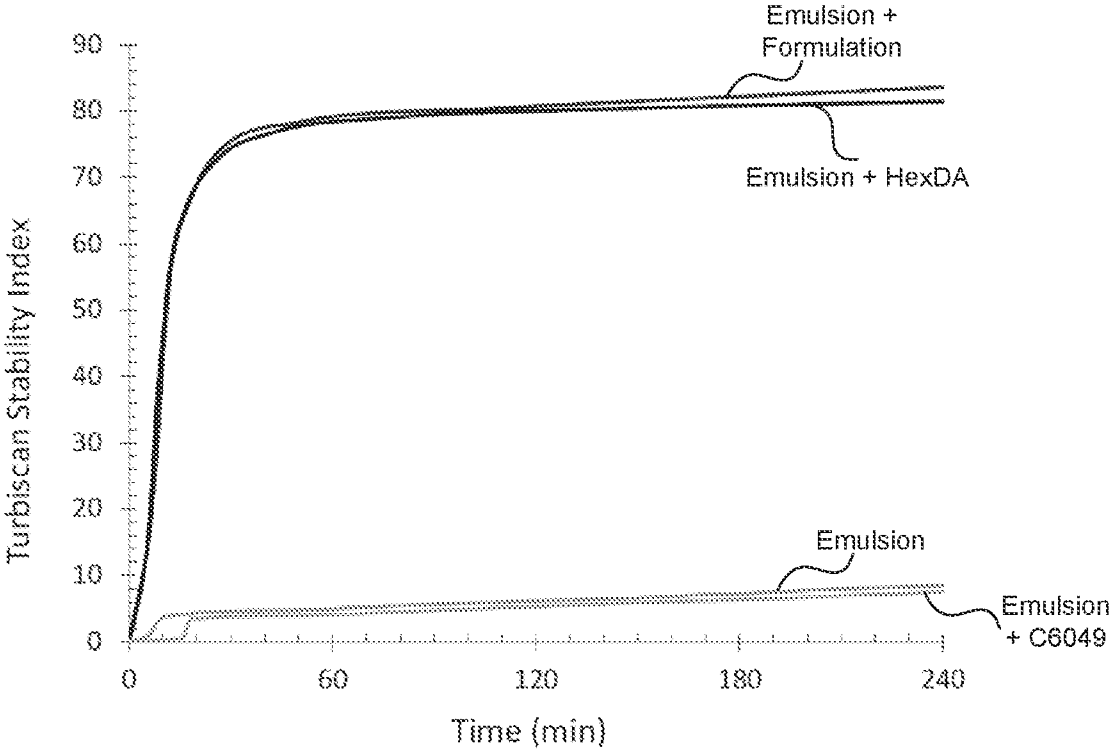
FIG. 23 is a graph of the Turbiscan stability index over time at 80° C. for SAGD Emulsion treated with no treatment ("Emulsion"), HexDA (92 ppm), C6049 (53 ppm) and HexDA+C6049 formulation (92 ppm; 53 ppm; "Formulation") treatments.

The kinetics of the o/w emulsion separation was monitored using the Turbiscan™ apparatus. The equipment permits the tracking of the separation and phase behavior by a Near Infrared (n-IR) signal and the transition or back scattering through the sample. FIGS. 22 and 23 show the Turbiscan Stability Index plotted as a function of time for SAGD Produced Water and Emulsion, respectively, which is an indication of the emulsion separation. For the SAGD Produced Water sample, the maximum separation is reached at 60 minutes for the HexDA+C6049 formulation. For the Emulsion sample, treatment with the HexDA+C6049 formulation results in very efficient separation in just 30 minutes.

Thus, the HexDA+C6049 formulation was able to significantly reduce oil content of SAGD Produced Water and Emulsion samples in less than 60 minutes of treatment. For both samples, oil content reduction was 99.9%, indicating that practically all of the dissolved and dispersed oil was separated by the treatment.

Example 4—Summary of Experiments

Tables 5 and 6 summarize the results of the experiments discussed above:

TABLE 5

Summary of Experimental Results on Synthetic oil-in-water Emulsion (at RT, ~23° C.)

| | Synthetic o/w Emulsion (RT) | | | | |
|---|---|---|---|---|---|
| | Dosage | Drop Zeta Potential (mV) | | Total Oil (ppm) | |
| Cationic Chemicals | (ppm) | Before | After | Before | After |
| 1-hexadecyltrimethylammonium bromide (HexDA) | 8 | −38 ± 14 | −10 ± 0.2 | 7736 | 190 |
| 1-butyltrimethylammonium bromide (BtyTA) | 325 | −38 ± 14 | ≈ 0 (e) | 7736 | — |
| C2019 | 20 | −38 ± 14 | ≈ 0 (e) | 7736 | — |
| C4039 | 30 | −38 ± 14 | ≈ 0 (e) | 7736 | — |
| C6049 | 11 | −38 ± 14 | −10 ± 0.05 | 7736 | 2460 |
| C8049 | 35 | −38 ± 14 | ≈ 0 (e) | 7736 | — |
| 1-hexadecyltrimethylammonium bromide & C6049 (combination) | 8 & 11 | −38 ± 14 | −5 ± 0.4 | 7736/ 8800 | 2.7/6 |
| 1-hexadecyltrimethylammonium bromide & C6049 (combination) | 24 & 33 | −38 ± 14 | 2.5 ± 0.1 | 7736 | 1084 |

(e) = interpolated from graph (zeta potential versus chemical concentration)

RT = Fluid sample processed at room temperature (~23° C.)

TABLE 6

| Summary of Experimental Results with Industrial SAGD Fluids (at 80° C.) | | | | | |
|---|---|---|---|---|---|
| | Industrial SAGD Fluids (Produced Water/Emulsion, 80° C.) | | | | |
| | Dosage | Drop Zeta Potential (mV) | | Total Oil (ppm) | |
| Cationic Chemicals | (ppm) | Before | After | Before | After |
| 1-hexadecyltrimethylammonium bromide | 92 | — | — | 510/ 5700 | 8/120 |
| C6049 | 53 | — | — | 510/ 5700 | 34/180 |
| 1-hexadecyltrimethylammonium bromide & C6049 (combination) | 92 & 53 | — | — | 510/ 5700 | 1/26 |

Table 5 summarizes the results for two cationic surfactants (1-hexadecyltrimethylammonium bromide "HexDA" and 1-butyltrimethylammonium bromide "BtyTA") and four cationic polymers (C2019, C4039, C6049 and C8049) that were tested on a synthetic o/w emulsion (with a total oil content of 7736 ppm) for oil removal efficiencies based on the premise that negatively charged oil drops in oil-in-water emulsion could be destabilized and separated from the water phase by reducing or neutralizing the surface charge on the oil drops.

Varying volumes of aqueous solutions of cationic additives were added to a series of pre-determined volumes of synthetic emulsion kept at room temperature conditions and the mixtures gently mixed. Zeta potential values of the mixtures were measured soon after the procedure and recorded to estimate a dosage level of additive just enough for the emulsion to approach isoelectric point (IEP) or attain a net neutral charge state. Reduction of surface charge reduced electrostatic repulsion between dispersed oil drops and promoted flocculation and/or coalescence leading to oil phase separation from the water phase. As a result of this procedure, corresponding IEP dosages for HexDA, BtyTA, C2019, C4039, C6049 and C8049 were found to be 8 ppm, 325 ppm, 20 ppm, 30 ppm, 11-15 ppm and 35 ppm, respectively. IEP measurements showed that cationic HexDA and cationic C6049 would require the lowest dosages (8 ppm and 11 ppm, respectively) to increase the oil-in-water emulsion zeta potential from about-34 mV to a low negative number approaching 0 mV and were therefore chosen for further study. Thereafter, chemical combinations (formulations) of surfactant HexDA and polymer C6049 were also tested on synthetic emulsion samples and their IEP dosages were determined.

Data from Table 5 shows that HexDA, C6049, and the HexDA-C6049 combination formulation (at IEP dosages) could successfully reduce total oil content in the water phase (in SAGD fluids) from 7736 ppm to 190 ppm, 2460 ppm, and 2.7 ppm, respectively. In contrast, a much higher dosage (3×) of the HexDA-C6049 combination only reduced total oil content to 1084 ppm. A high surfactant-polymer dose appeared to re-stabilize the oil drops to some extent by developing a net-positive zeta potential (2.5 mV) thereby preventing complete oil-water separation.

Table 6 summarizes the performance of the additives on industrial SAGD process water (i.e. the "SAGD Produced Water" of Example 3) and SAGD oil-in-water emulsion (i.e. the "Emulsion" of Example 4). Chemical testing was completed at 80° C. to replicate field processing conditions. Chemicals HexDA and C6049 at doses of 92 ppm and 53 ppm effectively reduced total oil in SAGD process water from 510 ppm to 8 and 34 ppm, respectively. The same chemical doses reduced oil content in SAGD emulsion from 5700 to 120 ppm and 180 ppm, respectively. Higher chemical doses were found to achieve oil reduction in SAGD emulsions compared to the synthetic emulsion (see Table 5). This was likely due to a higher concentration of dissolved organics in SAGD emulsions and the natural presence of strongly stabilized oil drops which were hard to destabilize. A synergy between the polymer and surfactant were observed such that the chemical combination performed significantly better than the polymer or surfactant alone and successfully reduced total oil in SAGD process water and SAGD emulsion to 1 ppm and 26 ppm, respectively.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method for treating water containing organic matter, wherein at least a portion of the organic matter is dissolved organic matter, comprising:

providing a cationic partially hydrolyzed polyacrylamide (PHPAM) polymer having a charge density of about 10% to about 40% and a molecular weight of about $600\times10^4$ g/mol to about $900\times10^4$ g/mol;

providing a cationic surfactant, the surfactant comprising a monocationic alkyl quaternary ammonium salt; and contacting the water with the polymer and the surfactant, wherein said contact reduces the concentration of the organic matter including the dissolved organic matter.

2. The method of claim 1, wherein the polymer and surfactant are combined prior to contacting the water.

3. The method of claim 1, wherein the polymer and surfactant are added to the water sequentially.

4. The method of claim 1, wherein the polymer and the surfactant are continuously mixed with the water for a suitable period of time.

5. The method of claim 1, wherein the monocationic alkyl quaternary ammonium salt is selected from: 1-hexadecyltrimethylammonium bromide, 1-hexadecyltrimethylammonium chloride, 1-dodecyltrimethylammonium bromide, 1-dodecyltrimethylammonium chloride, 1-tetradecyltrimethylammonium bromide, and 1-tetradecyltrimethylammonium chloride.

6. The method of claim 1, wherein the organic matter includes oil droplets and the dissolved organic matter includes dissolved oil, and wherein the water and the oil droplets and the dissolved oil form an oil-in-water emulsion.

7. The method of claim 6, wherein the polymer, the surfactant, and the oil are at a ratio of between about 1:1:1000 to 1:2:100 ppm.

8. The method of claim 6, wherein the polymer and the surfactant are at dosages determined based on the isoelectric point (IEP) of the oil droplets of the oil-in-water emulsion.

9. The method of claim 1, wherein the water is selected from: produced water from an oil recovery operation; process water from an oil recovery operation; wastewater from an industrial process; and process water from an industrial process.

10. The method of claim 6, wherein the untreated water has a total oil content of between 200 ppm and 10,000 ppm and the oil droplets have a mean droplet size of less than 2 microns.

11. The method of claim 1, wherein the monocationic alkyl quaternary ammonium salt is a suitable salt of the formula:

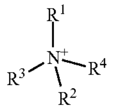

wherein $R^1$ is a $C_8$ to $C_{24}$ alkyl group and $R^2$, $R^3$, and $R^4$ are each a $C_1$ to $C_4$ alkyl group.

* * * * *